US007626518B2

(12) United States Patent
Hussain et al.

(10) Patent No.: US 7,626,518 B2
(45) Date of Patent: Dec. 1, 2009

(54) DECODING SYSTEMS AND METHODS IN COMPUTATIONAL CORE OF PROGRAMMABLE GRAPHICS PROCESSING UNIT

(75) Inventors: Zahid Hussain, England (GB); Huy Duc Bui, San Jose, CA (US); John Brothers, Calistoga, CA (US)

(73) Assignee: Via Technologies, Inc., Hsin-Tien, Taipei (TW)

( * ) Notice: Subject to any disclaimer, the term of this patent is extended or adjusted under 35 U.S.C. 154(b) by 11 days.

(21) Appl. No.: 11/760,247

(22) Filed: Jun. 8, 2007

(65) Prior Publication Data

US 2007/0297501 A1    Dec. 27, 2007

Related U.S. Application Data

(60) Provisional application No. 60/811,821, filed on Jun. 8, 2006.

(51) Int. Cl.
*H03M 7/34* (2006.01)
(52) U.S. Cl. .................................. 341/51; 375/240.25
(58) Field of Classification Search .............. 341/50, 341/51; 375/240.25, 240.23
See application file for complete search history.

(56) References Cited

U.S. PATENT DOCUMENTS

| | | | |
|---|---|---|---|
| 6,628,302 | B2 | 9/2003 | White et al. |
| 6,646,578 | B1 | 11/2003 | Au |
| 6,876,317 | B2 | 4/2005 | Sankaran |
| 2004/0101056 | A1* | 5/2004 | Wong et al. ............. 375/240.25 |
| 2005/0117655 | A1* | 6/2005 | Ju ........................ 375/240.28 |
| 2005/0135691 | A1 | 6/2005 | Reese |
| 2005/0156761 | A1 | 7/2005 | Oh |
| 2005/0249289 | A1 | 11/2005 | Yagasaki et al. |
| 2005/0259747 | A1 | 11/2005 | Schumann |
| 2006/0126744 | A1 | 6/2006 | Peng et al. |
| 2006/0133512 | A1* | 6/2006 | Park ....................... 375/240.25 |
| 2007/0040819 | A1 | 2/2007 | Inazumi |
| 2007/0116128 | A1 | 5/2007 | Evans et al. |
| 2007/0183491 | A1 | 8/2007 | Pearson et al. |
| 2007/0285286 | A1 | 12/2007 | Hussain et al. |
| 2007/0285287 | A1 | 12/2007 | Hussain et al. |
| 2007/0296613 | A1* | 12/2007 | Hussain et al. ................ 341/50 |
| 2008/0069241 | A1* | 3/2008 | Kadono et al. .......... 375/240.23 |

OTHER PUBLICATIONS

Chung-Hyo Kim, In-Cheol Park, Highspeed Decoding of Context-based Adaptive Binary Arithmetic Codes Using Most Probable Symbol Prediction, ISCAS 2006, 2006, pp. 1707-1710, 2006 IEEE.
Non-Final Office Action filed Jul. 16, 2008 for U.S. Appl. No. 11/760,274, U.S. Publication No. 2007-0296613.
Non-Final Office Action filed Jun. 30, 2008 for U.S. Appl. No. 11/759,431, U.S. Publication No. 2007-0285286.
Non-Final Office Action filed Jul. 17, 2008 for U.S. Appl. No. 11/760,296, U.S. Publication No. 2007-0285287.

* cited by examiner

*Primary Examiner*—Rexford N Barnie
*Assistant Examiner*—Joseph Lauture
(74) *Attorney, Agent, or Firm*—Thomas, Kayden, Horstemeyer & Risley

(57) ABSTRACT

Various embodiments of decoding systems and methods are disclosed. One system embodiment, among others, comprises a software programmable core processing unit having a variable length decoding unit (VLD) unit configured to execute a shader, the shader configured to selectively implement decoding of a video stream coded based on a plurality of different coding methods to provide a decoded data output, wherein the decoding is implemented using a combination of software and hardware.

15 Claims, 14 Drawing Sheets

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 16 | 17 | 18 | 19 | 20 | 21 | 22 | 23 | 24 | 25 | 26 | 27 | 28 | 29 | 30 | 31 |
| 32 | 33 | 34 | 35 | 36 | 37 | 38 | 39 | 40 | 41 | 42 | 43 | 44 | 45 | 46 | 47 |
| 48 | 49 | 50 | 51 |  |  |  |  |  |  |  |  |  |  |  |  |
|  |  |  |  |  |  |  |  |  |  |  |  |  |  |  |  |
|  |  |  |  |  |  |  |  |  |  |  |  |  |  |  |  |
|  |  |  |  |  |  |  |  |  |  |  |  |  |  |  |  |

FIG. 6E

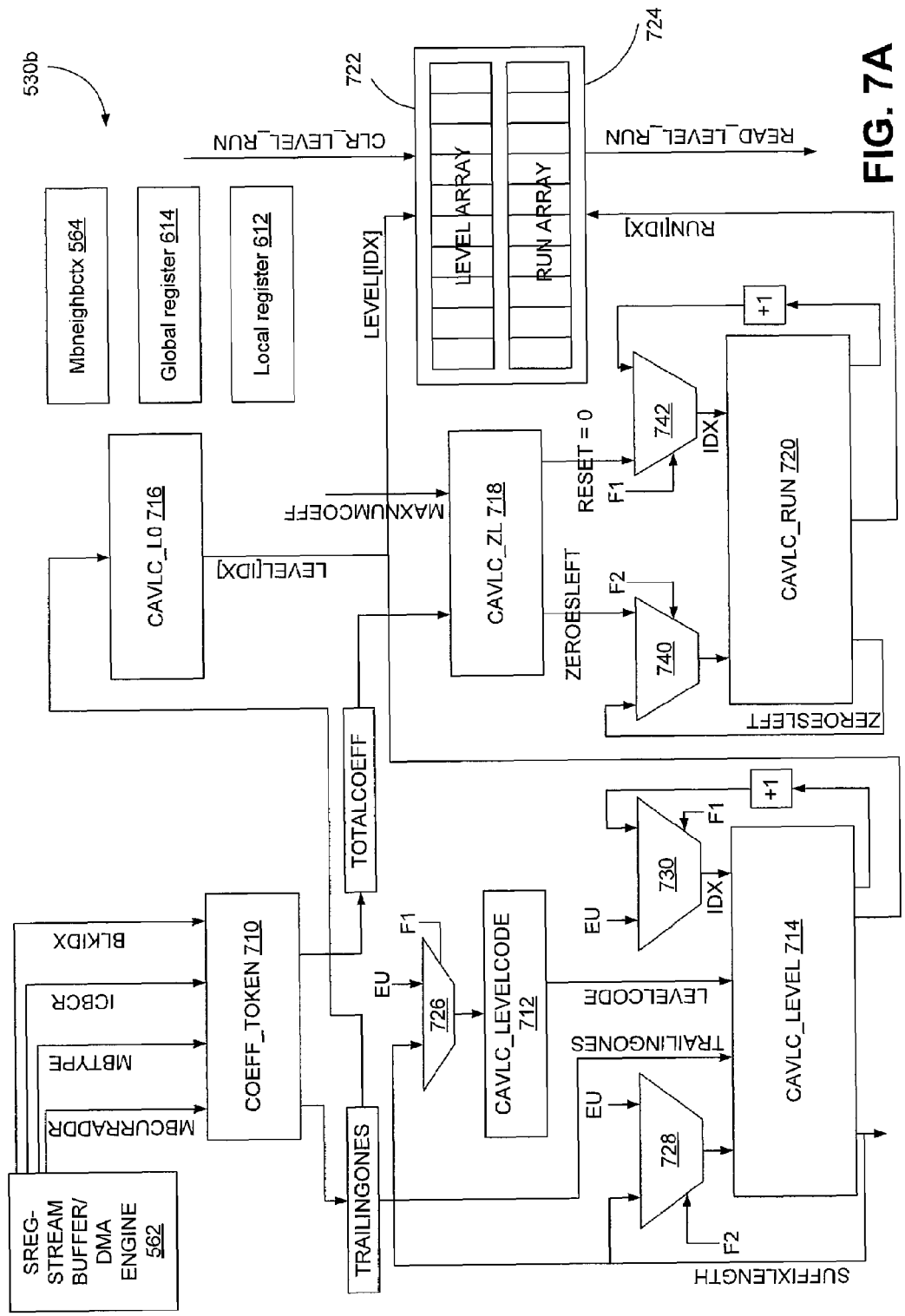

DECODING SYSTEMS AND METHODS IN COMPUTATIONAL CORE OF PROGRAMMABLE GRAPHICS PROCESSING UNIT

CROSS-REFERENCE TO RELATED APPLICATION

This application claims priority to copending U.S. provisional application entitled, "VARIABLE-LENGTH DECODING SYSTEMS AND METHODS," having Ser. No. 60/811,821, filed Jun. 8, 2006, which is entirely incorporated herein by reference.

TECHNICAL FIELD

The present disclosure is generally related to data processing systems, and more particularly, is related to programmable graphics processing systems and methods.

BACKGROUND

Computer graphics is the art and science of generating pictures, images, or other graphical or pictorial information with a computer. Many of the current graphics systems are implemented through the use of a set of interfaces, such as MICROSOFT's Direct3D interface, OpenGL, etc., that offer control of multimedia hardware (e.g., a graphics accelerator or graphics processing unit (GPU)) on a computer running a particular operating system, such as MICROSOFT WINDOWS, among others. The generation of pictures or images is commonly called rendering, and the nuts and bolts of such operations are primarily implemented through a graphics accelerator. Generally, in three-dimensional (3D) computer graphics, geometry that represents surfaces (or volumes) of objects in a scene is translated into pixels (picture elements), stored in a frame buffer, and then displayed on a display device. Each object or group of objects may have specific visual properties related to the appearance of surfaces (materials, reflectance, shape, textures, etc.) which may be defined as a rendering context for the object or group of objects.

Consumer demand for increasing sophistication in controls and features for games and other multimedia products for which computer graphics are used, as well as the desire for more realism in generated images, engenders improvements in processing speed and power. Various standards have been developed to improve the visual quality of generated images while consuming fewer bits. One of these standards, the H.264 specification (also known as the ISO Motion Picture Experts Group (MPEG)-4 part 10), is a high compression digital video codec standard. An H.264 compliant codec can encode video with approximately three times fewer bits than comparable MPEG-2 encoders while retaining similar video quality. The H.264 specification provides for two types of entropy encoding processes, including context-adaptive binary arithmetic coding (CABAC) and context-adaptive variable length coding (CAVLC).

Many different hardware-only or software-only solutions have been provided to help address these continually changing needs, resulting in higher inventories, rapidly obsolete technology, and inflexibility in design.

SUMMARY

Embodiments of decoding systems and methods in a multithreaded parallel computational core of GPU are disclosed. Briefly described, in architecture, one embodiment of the system, among others, comprises a software programmable core processing unit having a variable length decoding unit (VLD) unit configured to execute a shader, the shader configured to selectively implement decoding of a video stream coded based on a plurality of different coding methods to provide a decoded data output, wherein the decoding is implemented using a combination of software and hardware.

Another system embodiment, among others, comprises a graphics processing unit (GPU) coupled to a host processor and memory, the GPU comprising a graphics processor having a software programmable core processing unit comprising one or more execution units, the one or more execution units comprising execution unit data path hardware including a variable length decoding (VLD) unit, the VLD unit configured to execute a shader, the shader configured to selectively implement decoding of a video stream coded based on a plurality of different coding methods to provide a decoded data output.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of decoding systems and methods can be better understood with reference to the following drawings. The components in the drawings are not necessarily to scale, emphasis instead being placed upon clearly illustrating the principles of the systems and methods. Moreover, in the drawings, like reference numerals designate corresponding parts throughout the several views.

FIG. 6E is a block diagram that illustrates an exemplary macroblock decoding mechanism implemented by the decoding system shown in FIG. 6A.

FIG. 7A is a block diagram of an embodiment of the decoding system shown in FIG. 5C configured for context-adaptive variable length coding (CAVLC) decoding.

DETAILED DESCRIPTION

Figure 1:
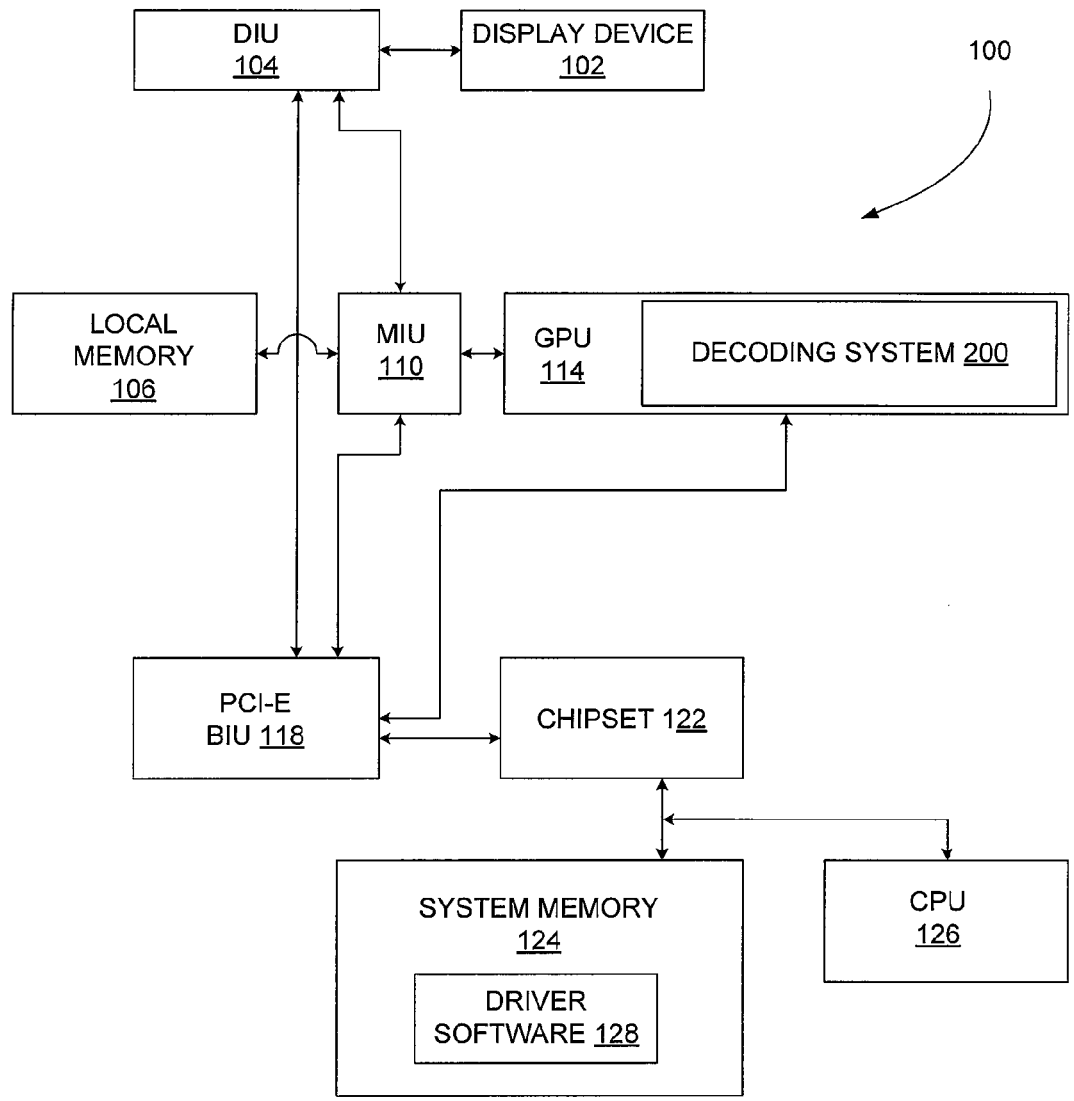
FIG. 1 is a block diagram of an embodiment of a graphics processor system in which various embodiments of decoding systems (and methods) are implemented.

Disclosed herein are various embodiments of decoding systems and methods (herein, such systems and methods also referred to collectively as a decoding system or decoding systems). In one embodiment, a decoding system is embedded in one or more execution units of a programmable, multithreaded, parallel computational core of a graphics processing unit (GPU). Decoding functionality is implemented using a combination of software and hardware. That is, video decoding is accomplished within the context of GPU programming, with the hardware implementation in a GPU data path. For instance, in one embodiment, decoding operations or methods are implemented by a shader (e.g., vertex shader) with an extended instruction set in cooperation with an execution unit data path of a GPU and additional hardware for the automatic management of a bitstream buffer. Such an embodiment is in contrast to existing systems, which possess hardware-only or software-only based solutions and hence can suffer from at least some of the problems described above in the background section of the present disclosure.

In the decoding systems described herein, the decoding of information coded using a plurality of entropy encoding techniques may be implemented. The decoding system is capable of decoding bitstreams according to the well-known International Telecommunication Union Telecommunication Standardization Sector (ITU-T) H.264 standard for context-adaptive binary arithmetic coding (CABAC) and context-adaptive variable length coding (CAVLC), and as well according to EXP-Golomb, Motion Pictures Expert Group (MPEG-2), and VC-1 standards. Various embodiments of the decoding systems operate according to one of a plurality of modes, each of the modes corresponding to one of the above-mentioned standards, based on the execution of one or more instruction sets received (e.g., via well known mechanisms such as pre-loading or through cache misses) from a GPU frame buffer memory or memory corresponding to a host processor (e.g., host central processing unit (CPU)). Based on a selected mode, different decoding methods may be employed. The hardware can be re-used to support multiple types of decoding standards (i.e., based on the selected mode). Further, the selected mode also affects the manner in which context memory is initialized, utilized, and/or updated.

Depending on the activated mode of decoding, the decoding system may decode information coded using such entropy coding techniques as Exp-Golomb coding, Huffman-like encoding (e.g., CAVLC, MPEG-2, VC-1), and/or arithmetic coding (e.g., CABAC). Entropy decoding methods are implemented by extending an instruction set corresponding to one or more execution unit(s), and providing additional hardware for automatically managing bitstreams and for implementing context models in CAVLC decoding and CABAC decoding, as described below. In one embodiment, various memory tables or other data structures (e.g., read-only memory (ROM) tables) are used for entropy coding tables.

Additionally, the automatic bitstream buffer referred to above provides certain advantages. For instance, once the location (e.g., address) of the bitstream is made known to a direct memory access (DMA) engine of the bitstream buffer, the management of the bitstream is automatic and hence involves no further instructions. Such a mechanism is in contrast to conventional microprocessor/digital signal processor (DSP) systems, where bitstream management represents a large overhead cost. Further, the bitstream buffer mechanisms, through tracking of the number of bits consumed, enables the detection and handling of a corrupt bitstream.

Another benefit of the decoding system embodiments described herein pertains to the minimization of instruction latency. For instance, since CABAC and CAVLC decoding is very sequential and multi-threading is not easy to exploit, a type of forwarding mechanism (e.g., register forwarding) is employed in the various embodiments to reduce the effective dependency latency. Explaining further, a limitation in many deep-pipelined, multi-threaded processors is that an instruction may not be executed every cycle out of the same thread. Some systems may employ general forwarding, which works by checking the address of the operands of the previous result and the instruction operand, and if the same, the result operands are used. Such general forwarding typically requires a complex set of comparing and multiplexing. In certain embodiments of decoding systems, a different type of forwarding is employed whereby bits in the instructions are used (e.g., 1 bit for each of the operands for a total of two bits) to encode whether the result of a previous computation (e.g., held in internal registers) should be used or should data in the source operands be used. Through this method, overall latency can be reduced while improving the efficiency of the processor pipeline.

FIG. 1 is a block diagram of an embodiment of a graphics processor system 100 in which embodiments of decoding systems and methods are implemented. In some implementations, the graphics processor system 100 may be configured as a computer system. The graphics processor system 100 may comprise a display device 102 driven by a display interface unit (DIU) 104 and local memory 106 (e.g., which may comprise a display buffer, frame buffer, texture buffer, command buffer, etc.). Local memory 106 may also be referred to interchangeably herein as a frame buffer or storage unit. Local memory 106 is coupled to a graphics processing unit (GPU) 114 through one or more memory interface units (MIU) 110. The MIU 110, GPU 114, and DIU 104 are coupled in one embodiment to a peripheral component interconnect express (PCIE) compatible bus interface unit (BIU) 118. In one embodiment, the BIU 118 may employ a graphics address remapping table (GART), although other memory mapping mechanisms may be employed. The GPU 114 includes the decoding system 200, as described below. Although shown as a component of the GPU 114, in some embodiments, the decoding system 200 may include one or more additional components of the graphics processor system 100 that are shown, or different components.

The BIU 118 is coupled to a chipset 122 (e.g., north bridge chipset) or switch. The chipset 122 comprises interface electronics to strengthen signals from a central processing unit (CPU) 126 (also referred to herein as a host processor) and to separate signals to and from a system memory 124 from those signals going to and from input/output (I/O) devices (not shown). Although a PCIE bus protocol is described, other manners of connection and/or communication between the host processor and the GPU 114 may be implemented in some embodiments (e.g., PCI, proprietary high-speed bus, etc.). The system memory 124 also comprises driver software 128, which communicates instruction sets or commands through the use of the CPU 126 to registers in the GPU 114.

Additional graphics processing units may be employed in some embodiments, coupled for instance to the components shown in FIG. 1 through the chipset 122 via a PCIE bus protocol among others. In one embodiment, the graphics processor system 100 may embody all of the components shown in FIG. 1, or fewer and/or different components than those shown in FIG. 1. Further, in some embodiments, additional components may be used, such as a south bridge chipset coupled to the chipset 122.

Figure 2:
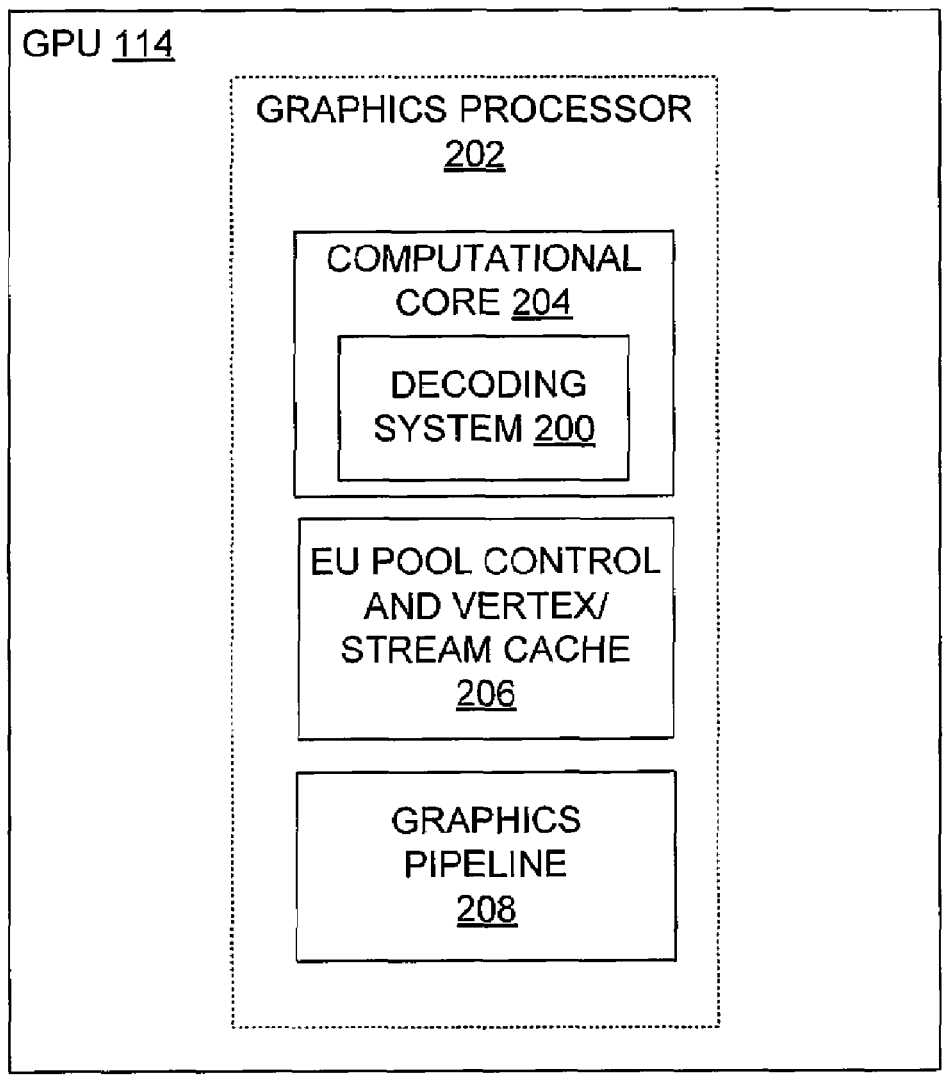
FIG. 2 is a block diagram that illustrates an exemplary processing environment in which various embodiments of decoding systems are implemented.

Reference is now made to FIG. 2, which is a block diagram that illustrates an exemplary processing environment in which an embodiment of a decoding system 200 is implemented. In particular, the GPU 114 is shown, and includes a graphics processor 202. The graphics processor 202 comprises a multiple execution unit (EU), computational core 204 (also known as a software programmable core processing unit) that, in one embodiment, comprises the decoding system 200 (also known as a VLD unit) embedded in an execution unit data path (EUDP) distributed among one or more execution units. The graphics processor 202 also comprises an execution unit pool (EUP) control and vertex/stream cache unit 206 (herein, EU pool control unit 206) and a graphics pipeline with fixed function logic 208 (e.g., including a triangle set-up unit (TSU), span-tile generator (STG), etc.) as explained below. The computational core 204 comprises a pool of multiple execution units to meet the computing requirements imposed by shader tasks associated with various shader programs, including a vertex shader, geometry shader, and/or pixel shader processing data for the graphics pipeline 208. As the functionality of the decoding system 200 in one embodiment is implemented largely through a shader of the computational core 204, a general description of an embodiment of a graphics processor is described, followed by the particulars of certain embodiments of the decoding system 200.

The decoding system 200 can be implemented in hardware, software, firmware, or a combination thereof. In the preferred embodiment(s), the decoding system 200 is implemented in hardware and software, including any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), state machine, etc.

Figure 3:
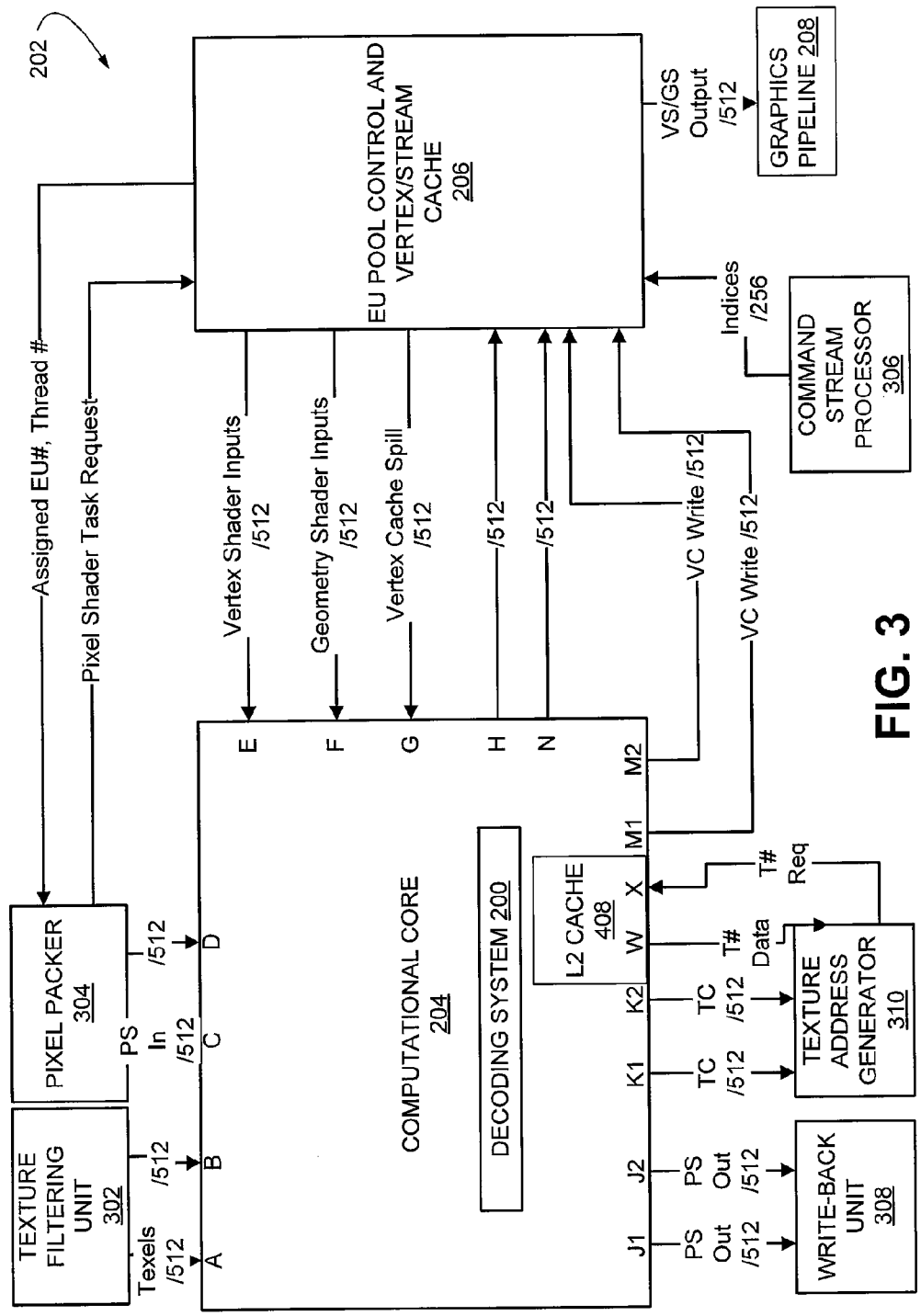
FIG. 3 is a block diagram that illustrates select components of the exemplary processing environment shown in FIG. 2.
Figure 4:
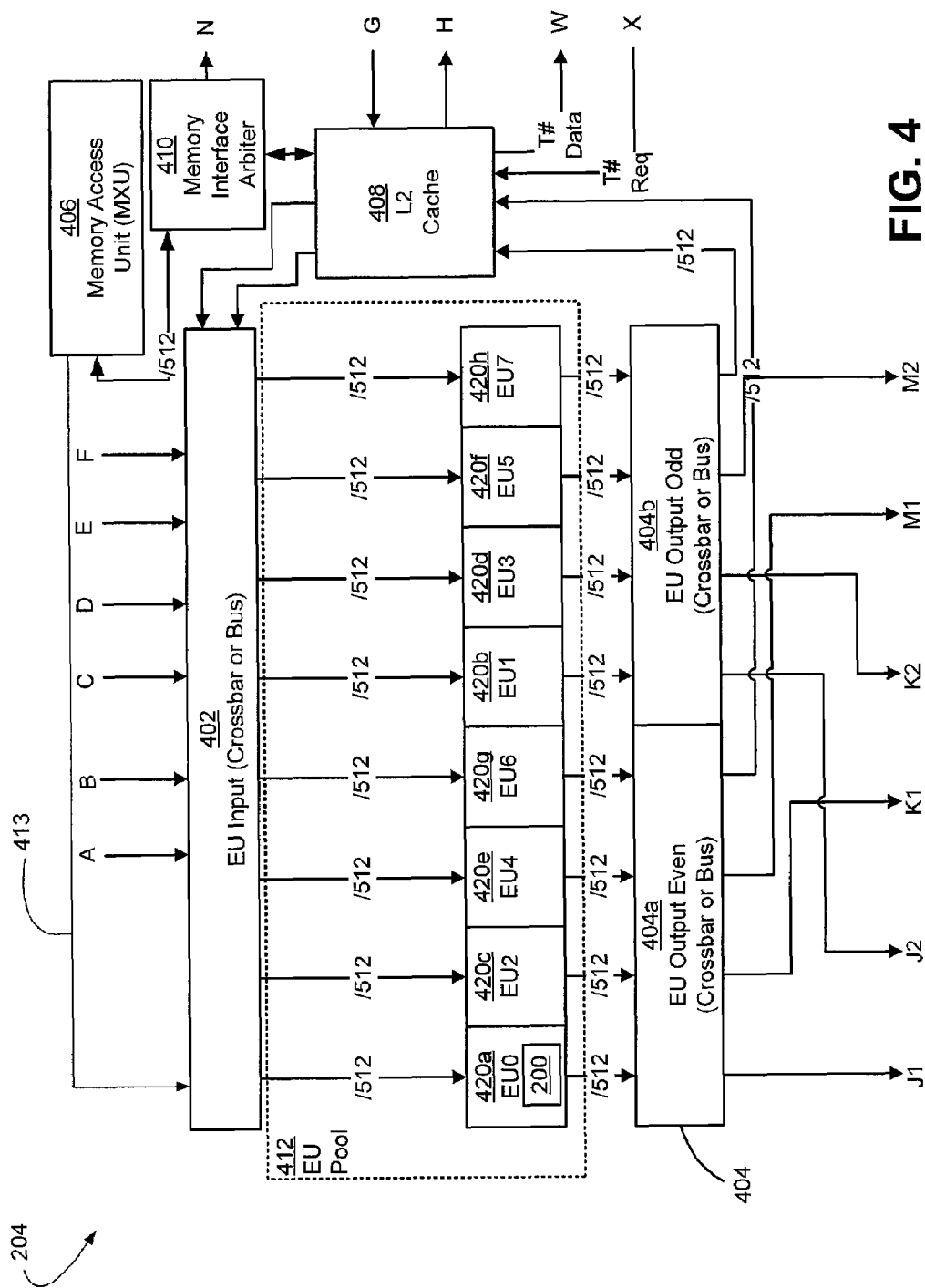
FIG. 4 is a block diagram that illustrates a computational core of the exemplary processing environment shown in FIGS. 2-3 in which various embodiments of decoding systems are implemented.

Reference is now made to FIGS. 3-4, which are block diagrams that each show select components of an embodiment of a graphics processor 202. As explained above, since one embodiment of a decoding system 200 can be implemented as a shader in the graphics processor 202 with an extended instruction set and additional hardware components, a general description of an embodiment of a graphics processor 202 and corresponding processing is described below. While not all components for graphics processing are shown, the components shown in FIGS. 3-4 should be sufficient for one having ordinary skill in the art to understand the general functions and architecture related to such graphics processors. Referring to FIG. 3, at the center of the programmable processing environment is a computational core 204, which processes various instructions and includes the decoding system 200. Various types of shader programs can be executed or mapped to the computational core 204, including vertex, geometry and pixel shader programs. The computational core 204, for multi-issue processors, is capable of processing multiple instructions within a single clock cycle.

As shown in FIG. 3, the relevant components of the graphics processor 202 comprise the computational core 204, a texture filtering unit 302, a pixel packer 304, a command stream processor 306, a write-back unit 308, and a texture address generator 310. Also included in FIG. 3 is the EU pool control unit 206, which also includes a vertex cache and/or a stream cache. For example, as shown in FIG. 3, the texture filtering unit 302 provides texel data to the computational core 204 (inputs A and B). For some embodiments, the texel data is provided as 512-bit data.

The pixel packer 304 provides pixel shader inputs to the computational core 204 (inputs C and D), also in 512-bit data format. Additionally, the pixel packer 304 requests pixel shader tasks from the EU pool control unit 206, which provides an assigned EU number and a thread number to the pixel packer 304. Since pixel packers and texture filtering units are known in the art, further discussion of these components is omitted here. While FIG. 3 shows the pixel and texel packets as 512-bit data packets, it should be appreciated that the size of the packets can be varied for some embodiments, depending on the desired performance characteristics of the graphics processor 202.

The command stream processor 306 provides triangle vertex indices to the EU pool control unit 206. In the embodiment of FIG. 3, the indices are 256-bits. The EU pool control unit 206 assembles vertex shader inputs from the stream cache and sends data to the computational core 204 (input E). The EU pool control unit 206 also assembles geometry shader inputs and provides those inputs to the computational core 204 (input F). The EU pool control unit 206 also controls an EU input 402 (FIG. 4) and an EU output 404 (FIG. 4). In other words, the EU pool control unit 206 controls the respective inflow and outflow to the computational core 204.

Upon processing, the computational core 204 provides pixel shader outputs (outputs J1 and J2) to the write-back unit 308. The pixel shader outputs include color information, such as red/green/blue/alpha (RGBA) information, which is known in the art. The pixel shader output may be provided as two 512-bit data streams. Other bit-widths may also be implemented in some embodiments.

Similar to the pixel shader outputs, the computational core 204 outputs texture coordinates (outputs K1 and K2), which include UVRQ information, to the texture address generator 310. The texture address generator 310 issues a texture descriptor request (T# Req) to an L2 cache 408 of the computational core 204 (input X), and the L2 cache 408 of computational core 204 outputs (output W) the texture descriptor data (T# data) to the texture address generator 310. Since the various examples of the texture address generator 310 and the write-back unit 308 are known in the art, further discussion of those components is omitted here. Again, while the UVRQ and the RGBA are shown as 512 bits, it should be appreciated that this parameter may also be varied for some embodiments. In the embodiment of FIG. 3, the bus is separated into two 512-bit channels, with each channel holding the 128-bit RGBA color values and the 128-bit UVRQ texture coordinates for four pixels.

The graphics pipeline 208 comprises fixed-function graphics processing functionality. Responsive to a command from the driver software 128, such as to draw a triangle, vertex information is passed to vertex shader logic in the computational core 204 to implement vertex transformations. In particular, objects are transformed from object space to work space and/or screen space as triangles. The triangles are passed from the computational core 204 to a triangle set-up unit (TSU) in the graphics pipeline 208, which assembles primitives, and also performs known tasks such as bounding box generation, culling, edge function generation, and triangle level rejections, among other known functions. The TSU passes data to a span and tile generation unit of the graphics pipeline 208, which provides tile generation functionality, whereby the data objects are segmented into tiles (e.g., 8×8, 16×16, etc.) and passed to another fixed function unit configured to performs depth (e.g., z-value) processing, such as high level (e.g., where fewer bits are consumed than similar processing at a lower level) rejection of z-values. The z-values are passed back to pixel shader logic in the computational core 204 for the performance of pixel shader functionality based on received texture and pipelined data. The computational core 204 outputs processed values to destination units located in the graphics pipeline 208. The destination units are configured to perform alpha testing and stencil testing before values in various caches need to be updated.

Note that the L2 cache 408 of the computational core 204 and the EU pool control unit 206 also transfer to each other 512-bit vertex cache spill data. Additionally, two 512-bit vertex cache writes are output from the computational core 204 (outputs M1 and M2) to the EU pool control unit 206 for further handling.

Referring to FIG. 4, additional components of the computational core 204 and related components are shown. The computational core 204 comprises an execution unit (EU) pool 412, which in one embodiment comprises one or more execution units (EUs) 420a through 420h (collectively referred to herein as EUs 420). Each of the EUs 420 is capable of processing multiple instructions within a single clock cycle. Thus, the EU pool 412, at its peak, can process multiple threads simultaneously or substantially simultaneously. While eight (8) EUs 420 are shown in FIG. 4 (labeled EU0 through EU7), it should be appreciated that the number of EUs need not be limited to eight, but may be greater or fewer in number for some embodiments. At least one of the execution units, for instance EU0 420a, comprises an embodiment of the decoding system 200, as explained further below.

The computational core 204 also comprises a memory access unit 406 that is coupled to the L2 cache 408 through a memory interface arbiter 410. The L2 cache 408 receives vertex cache spill (input G) from the EU pool control unit 206 and provides vertex cache spill (output H) to the EU pool control unit 206. Additionally, the L2 cache 408 receives texture descriptor T# requests (input X) from the texture address generator 310, and provides the texture descriptor T# data (output W) to the texture address generator 310 in response to the received request.

The memory interface arbiter 410 provides a control interface to the local video memory (e.g., frame buffer or local memory 106). The BIU 118 provides an interface to the system through, for example, a PCIE bus. The memory interface arbiter 410 and BIU 118 provide the interface between the memory and the L2 cache 408. For some embodiments, the L2 cache 408 connects to the memory interface arbiter 410 and the BIU 118 through the memory access unit 406. The memory access unit 406 translates virtual memory addresses from the L2 cache 408 and other blocks to physical memory addresses.

The memory interface arbiter 410 provides memory access (e.g., read/write access) for the L2 cache 408, fetching of instructions/constants/data/texture, direct memory access (e.g., load/store), indexing of temporary storage access, register spill, vertex cache content spill, etc.

The computational core 204 further comprises an EU input 402 and an EU output 404, which are respectively configured to provide the inputs to the EU pool 412 and receive the outputs from the EU pool 412. The EU input 402 and the EU output 404 may be crossbars or buses or other known input and output mechanisms.

The EU input 402 receives the vertex shader input (E) and the geometry shader input (F) from the EU pool control unit 206, and provides that information to the EU pool 412 for processing by the various EUs 420. Additionally, the EU input 402 receives the pixel shader input (inputs C and D) and the texel packets (inputs A and B), and conveys those packets to the EU pool 412 for processing by the various EUs 420. Additionally, the EU input 402 receives information from the L2 cache 408 (L2 read) and provides that information to the EU pool 412 as needed.

The EU output 404 in the embodiment of FIG. 4 is divided into an even output 404a and an odd output 404b. Similar to the EU input 402, the EU output 404 can be crossbars or buses or other known architectures. The even EU output 404a handles the output from the even EUs 420a, 420c, 420e, 420g, while the odd EU output 404b handles the output from the odd EUs 420b, 420d, 420f, 420h. Collectively, the two EU outputs 404a, 404b receive the output from the EU pool 412, such as the UVRQ and the RGBA. Those outputs, among others, may be directed back to the L2 cache 408, or output from the computational core 204 to the write-back unit 308 through J1 and J2 or output to the texture address generator 310 through K1 and K2.

The execution unit flow of the EU pool 412 generally comprises several levels, including a rendering context level, thread or task level, and an instruction or execution level. At any given time, there may be two rendering contexts allowed in each execution unit 420, with the contexts identified by the use of a one bit flag or other mechanisms. The context information is passed from the EU pool control unit 206 before tasks belonging to this context are commenced. Context level information may include shader type, number of input/output registers, instruction starting address, output mapping table, vertex identifier, and constants in a respective constant buffer. Each execution unit 420 of the EU pool 412 may store a plurality of tasks or threads (e.g., in some embodiments, thirty-two threads) at the same time. In one embodiment, each thread fetches an instruction according to a program counter.

The EU pool control unit 206 functions as global scheduler for the tasks and assigns appropriate threads in the execution units 420, using a data-driven approach (e.g., vertex, pixel, geometry packet in the input). For instance, the EU pool control unit 206 assigns a thread to one of the empty thread slots in the respective execution unit 420 of the EU pool 412. Data fed by a vertex cache or other component or module (depending on the shader type) is placed in a common register buffer, after which execution of a thread may commence.

In general, an embodiment of the graphics processor 202 utilizes programmable vertex, geometry, and pixel shaders. Rather than implementing the functions or operations of these components as separate fixed function units with different designs and instruction sets, the operations are instead executed by the pool of execution units 420a, 420b . . . 420n with a unified instruction set. Each of these execution units 420, except EU 420a (which comprises the decoding system 200 and thus has added functionality) is identical in design and configurable for programmed operation. In one embodiment, each execution unit 420 is capable of multi-threaded operations simultaneously. As various shader tasks are generated by the vertex shader, geometry shader, and pixel shader, they are delivered to the respective execution units 420 to be carried out. The decoding system 200 may be implemented in one embodiment using a vertex shader, with some modifications and/or differences from other execution units 420. For instance, one difference between an execution unit embodying the decoding system 200, such as the execution unit 420a, and the other execution units (e.g., 420b of FIG. 4), is that data for the decoding system 200 is received from the MXU 406 via connection 413 and the EU input 402, due in part to the management by the decoding system 200 of one or more corresponding internal buffers.

As individual tasks are generated, the EU pool control unit 206 handles the assigning of those tasks to available threads within the various execution units 420. As tasks are completed, the EU pool control unit 206 further manages the release of the relevant threads. In this regard, the EU pool control unit 206 is responsible for assigning vertex shader, geometry shader, and pixel shader tasks to threads of the various execution units 420, and also, performs an associated "bookkeeping" of the tasks and threads. Specifically, the EU pool control unit 206 maintains a resource table (not specifically illustrated) of threads and memories for all execution units 420. The EU pool control unit 206 particularly knows which threads have been assigned tasks and are occupied, which threads have been released after thread termination, how many common register file memory registers are occupied, and how much free space is available for each execution unit.

Accordingly, when a task is assigned to one execution unit (e.g., 420a), the EU pool control unit 206 will mark the thread as busy and subtract the total available common register file memory by the amount of the appropriate register file footprint for each thread. This footprint is set or determined by states for the vertex shader, geometry shader, and pixel shader. Further, each of the shader stages may have different footprint sizes. For example, a vertex shader thread may require ten (10) common register file registers, while a pixel shader thread may only require five such registers.

When a thread completes its assigned task(s), the execution unit 420 running the thread sends an appropriate signal to the EU pool control unit 206. The EU pool control unit 206, in turn, updates its resource table to mark the thread as free and to add the amount of total thread common register file space back to the available space. When all threads are busy or all the common register file memory has been allocated (or there is too little register space remaining to accommodate an additional thread), then the execution unit 420 is considered full and the EU pool control unit 206 will not assign any additional or new threads to that execution unit.

A thread controller is also provided inside each of the execution units 420, and this thread controller is responsible for managing or marking each of the threads as active (e.g., executing) or available. In this regard, at least in one embodiment, the EU pool control unit 206 can prohibit the geometry shader and pixel shader from running at the same time as the vertex shader when the vertex shader is executing functionality of the decoding system 200.

Figure 5A:
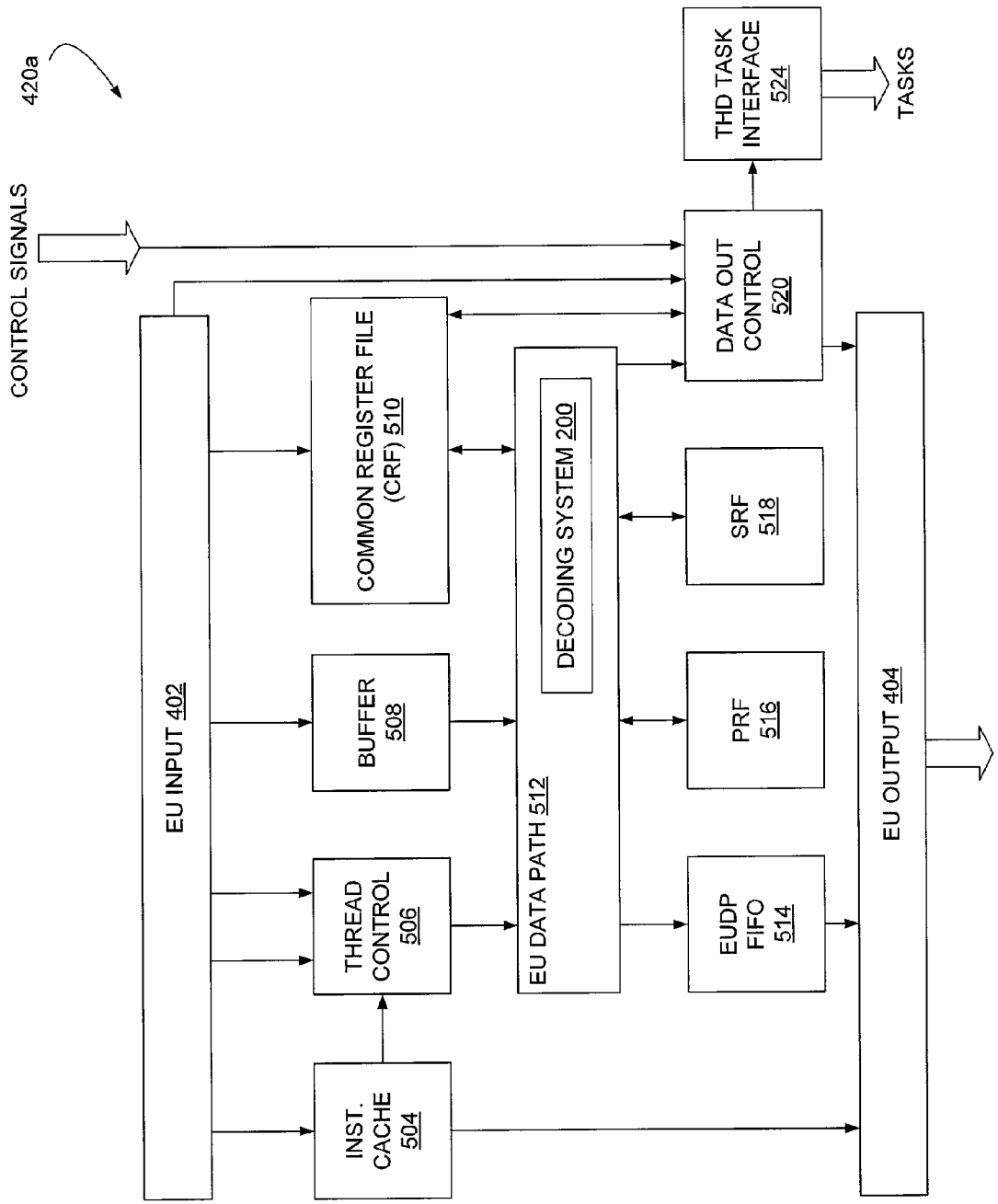
FIG. 5A is a block diagram that illustrates select components of an execution unit of the computational core shown in FIG. 4 in which various embodiments of decoding systems are implemented.

Having described various features of an embodiment of a graphics processor 202 and computational core 204, an embodiment of the execution unit 420a including an EU data path in which the decoding system 200 is embedded is now described in association with FIG. 5A. In particular, FIG. 5A is a block diagram of the execution unit 420a, which in one embodiment, comprises an instruction cache controller 504, a thread controller 506 coupled to the instruction cache controller 504, a buffer 508 (e.g., constant buffer), a common register file (CRF) 510, an EU data path (EUDP) 512 coupled to the thread controller 506, buffer 508, and CRF 510, an EUDP FIFO 514, a Predicate Register File (PRF) 516, a Scalar Register File (SRF) 518, a data out controller 520, and a thread task interface 524. As explained above, the execution unit 420a receives input from EU input 402 and provides an output to EU output 404.

The thread controller 506 provides control functionality for the entire execution unit 420a, with functionality including the management of each thread and decision-making functionality such as determining how threads are to be executed. The EUDP 512 comprises the decoding system 200, as explained further below, and in general, comprises functionality for performing various calculations, and includes such logic as floating point and integer arithmetic logic units (ALUs), shift logic functionality, among other logic.

The data out controller 520 comprises functionality to move finished data to certain components connected to the EU output 404, such as the vertex cache of the EU pool control unit 206, write back unit 308, etc. The EUDP 512 passes "end of task" information to the data out controller 520, notifying the same that a task is completed. The data out controller 520 comprises storage for the completed task (e.g., 32 entries), as well as a plurality of write ports. The data out controller 520 selects tasks from storage, and reads out all output data items in register locations specified by a shader rendering-context from the CRF 510 and sends data to the EU output 404.

The thread task interface 524 sends out task identifiers that are completed in the execution unit 420a to the EU pool control unit 206. That is, the task identifiers provide notification to the EU pool control unit 206 that a thread resource in a particular execution unit, for instance execution unit 420a, is available for a new task assignment.

In one embodiment, the constant buffer 508 may be divided up into 16 blocks, with each block having 16 slots with 128-bit horizontal vector constants in each. A constant buffer slot is accessed in a shader using an operand and index, wherein the index may be a temporary register comprising, for example, a 32-bit unsigned integer or an immediate 32-bit unsigned integer constant.

The instruction cache controller 504 is an interface block to the thread controller 506. When there is a thread controller read request (e.g., to fetch executable shader code from instruction memory), the instruction cache controller 504 preferably performs a hit/miss test by looking up a tag table (not shown). For example, a hit occurs when a requested instruction is in a cache of the instruction controller 504. A miss occurs when this requested instruction is to be fetched from the L2 cache 408 or memory 106. If a hit occurs, the instruction cache controller 504 grants the request if there is no request from the EU input 402 because the instruction cache of the instruction cache controller 504 has 1RW port limitation and the EU input 402 has higher priority. Otherwise, if a miss occurs, the instruction cache controller 504 grants the request when there is a replaceable block in the L2 cache 408 and there is space in the pending request EUDP FIFO 514. In one embodiment, the cache of the instruction cache controller 504 comprises 32 sets, with four blocks per set. Each block carries a 2-bit status signal to indicate three (3) states of invalid, loading, or valid. A block is "invalid" before being loaded with L2 data, becomes "loading" when waiting for L2 data, and becomes "valid" after L2 data loads in.

The predicate register file (PRF) 516 is read from and written to by the EUDP 512. The EU input 402 serves as an interface for incoming data to the execution unit 420a. In one embodiment, the EU input 402 comprises an 8-entry FIFO to buffer the incoming data. The EU input 402 also comprises functionality to pass data to the instruction cache of the instruction cache controller 504 and the constant buffer 508. The EU input 402 also maintains shader contexts.

The EU output 404 serves as an interface for outgoing data from the execution unit 420a into the vertex cache of the EU pool control unit 206, the L2 cache 408, and the write back unit 308. In one embodiment, the EU output 404 comprises a 4-entry FIFO to receive arbitrated requests and to buffer the data for the EU pool control unit 206. The EU output 404 comprises various functionality, including functionality to arbitrate the request from an instruction cache read request, data out write request, and EUDP read/write request.

The CRF 510 is used to store input, output, and temporary data. In one embodiment, the CRF 510 comprises eight (8) banks with 1R1W and 1RW ports of a 128×128-bit register file. The 1R+1W ports are used by the EUDP 512 for read and write access initiated by instruction execution. Banks 0, 2, 4, and 6 are shared among even numbered threads and banks 1, 3, 5, and 7 are shared among odd numbered threads. The thread controller 506 pairs instructions from different threads and ensures that there is no read or write bank conflict on the CRF memories.

The 1RW port is used by the EU input 402 and data out controller 520 for loading the initial thread input data and writing the final thread output to the EU pool control unit data buffers and L2 cache 408 or other modules. The 1RW I/O port is shared by both the EU input 402 and EU output 404, and write in one embodiment has higher priority than read. The 512-bits of the input data goes to four different banks to avoid any conflict when loading data into the CRF 510. A 2-bit channel index is passed in along with the data and 512-bit aligned base address to specify the starting bank of the input data. For example, if the starting channel index is 1, then the first 128-bits from the least significant bit (LSB) is loaded into bank 1, the next into bank 2, . . . etc., and the last into bank 0, assuming the thread based bank offset is 0. Note the two LSBs of the thread ID are used to generate a bank offset to randomize the starting bank location for each thread.

The CRF register index along with the thread ID can be used to construct a unique logical address for tag matching in reading and writing data in the CRF 510. For instance, the address may be aligned to 128 bits, the width of the CRF bank. Thirteen (13) bits of the address may be constructed from combining the 8-bit CRF register index and the 5-bit thread ID to create a unique address. Each 1024-bit line has a tag, and there are two 512-bit entries (words) on each line. Each word is stored across four banks and the two LSBs of the CRF index are added to the bank offset of current thread to create the bank selection.

The tag matching scheme allows the registers of different threads to share the CRF 510 to make good utilization of the memory, since the EU pool control unit 206 keeps track of memory usage of the CRF 510 and ensures there is enough space before scheduling a new task to the execution unit 420a.

The destination CRF index is checked against the size of the total CRF registers for a current thread. The input data is expected to be present in the CRF 510 before the thread controller 506 commences the thread and shader execution begins. The output data is read from the CRF 510 by the data out controller 520 after thread execution ends.

Figure 5B:
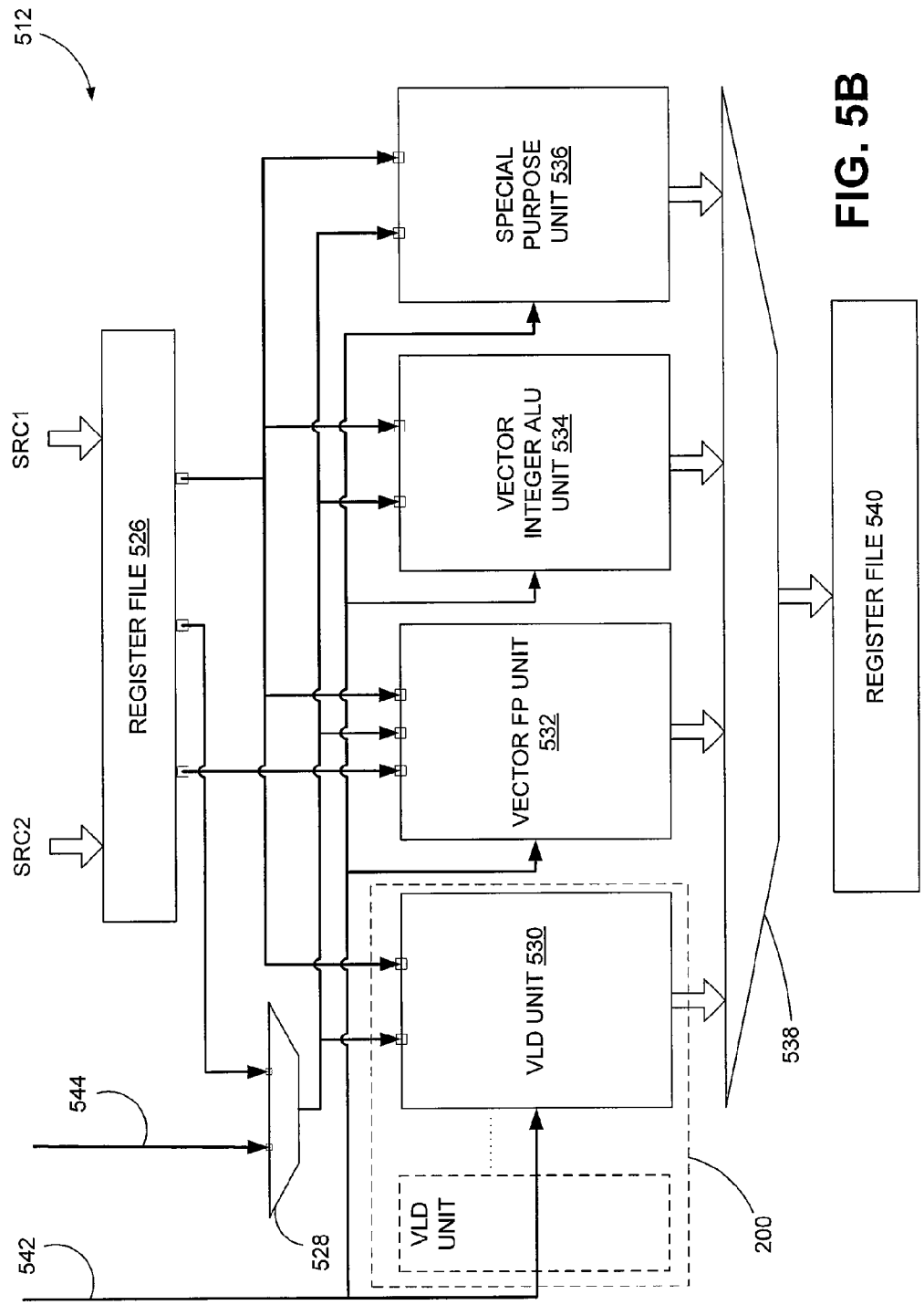
FIG. 5B is a block diagram of an execution unit data path in which various embodiments of decoding systems are implemented.

Having described an embodiment of an execution unit 420a comprising an EUDP 512 in which an embodiment of the decoding system 200 is implemented, an embodiment of the EUDP 512 is shown in FIG. 5B and described as follows. The EUDP 512 comprises a register file 526, a multiplexer 528, a vector floating point (FP) unit 532, a vector integer ALU unit 534, a special purpose unit 536, a multiplexer 538, a register file 540, and the decoding system 200. The decoding system 200 comprises one or more variable length decoding (VLD) units 530, resulting in the ability to decode one or more streams. For instance, a single VLD unit 530 enables the decoding of a single stream, two VLD units 530 (e.g., one shown in phantom but without connections for brevity) enables the simultaneous decoding of two streams, etc. For purposes of illustration, the below description addresses the operations of the decoding system 200 using a single VLD unit 530, with the understanding that the principles can be similarly applied to more than a single VLD unit.

As shown, the EUDP 512 comprises a number of parallel datapaths corresponding to the VLD unit 530, vector floating point unit 532, vector integer ALU 534, and special purpose unit 536, each of which executes a corresponding operation based on the received instruction. Operands (denoted SRC1 and SRC2) are received at the register file 526, the latter of which in one embodiment may correspond to the CRF 510, PRF 516, and/or SRF 518 shown in FIG. 5A. Note that in some embodiments, additional operands may be used. Operation (function) signal line 542 provides a medium for the receipt of operation signals to be received at each respective unit 530-536. Immediate signal line 544, coupled to the multiplexer 528, carries an immediate value encoded into instructions for use by each unit 530-536 in carrying out integer operations on small integer values. The operands, operation (function) signals, and immediate signals are provided by an instruction decoder (not shown). The multiplexer 538 at the end of the datapaths (which may comprise a writeback phase) selects a result of the correct datapath that is selected and provides an output to the register file 540. The output register file 540 comprises a destination, and may be the same component as the register file 526 or a different register. Note that in embodiments where the source and destination register comprise the same component, bits are provided in the instructions with source and destination selects that are used by the multiplexer to multiplex the data to/from the appropriate register file.

Hence, the execution unit 420a may be viewed as a multi-stage (e.g., four (4)-stage pipeline, with four arithmetic logic units (ALUs)), and decoding operations occur within the four execution phases. Stalls are implemented as needed to allow decoding threads to be executed. For instance, stalls may be incorporated in the execution of the stages when there is an underflow in a bit stream buffer, when waiting for context memory to be initialized, when waiting for the bitstream to be loaded into a FIFO buffer and sREG register (explained below), and/or generally when processing time has exceeded a predetermined threshold of time.

As explained above, in some embodiments, the decoding system 200 is configured for the simultaneous decoding of two bit streams using a single execution unit 420a. For instance, the decoding system 200 can employ two data paths (e.g., with the addition of another VLD unit 530) to perform simultaneous two-stream decoding according to an extended instruction set, although fewer or greater streams may be decoded (and hence fewer or greater data paths may be utilized) at one time. Certain embodiments of the decoding system 200 are not limited to simultaneous decoding when multiple streams are involved. Further, in some embodiments, a single VLD unit 530 may implement multiple simultaneous decoding of streams.

In embodiments where the decoding system 200 employs two data paths, two threads may run at the same time. For instance, in a two-stream decoding embodiment, the number of threads are limited to two, with a first thread (e.g., thread0) assigned to a first bank (i.e., VLD unit 530) of the decoding system 200 and a second thread (e.g., thread1) assigned to a second bank (e.g., the VLD unit shown in phantom in FIG. 5B) of the decoding system 200. In some embodiments, two or more threads may run on a single bank. In some embodiments, the decoding system 200, though shown as embedded within the EUDP 512, may comprise additional components, such as logic in the EU pool control unit 206. In the description that follows, the VLD unit 530 and the decoding system 200 is used interchangeably, with the understanding that the decoding system may comprise one or more VLD units 530.

Having described the underlying architecture for the decoding system 200, each individual decoding system mode is described in the following. In particular, the following instructions, set forth in one embodiment by the driver software 128, set the various modes, described further below: INIT_CTX (places the decoding system 200 in a CABAC processing mode), INIT_CAVLC (places the decoding system 200 in a CAVLC processing mode), INIT_MPEG2 (places the decoding system 200 in an MPEG-2 processing mode), and INIT_VC1 (places the decoding system 200 in a VC-1/WMV9 processing mode). In some embodiments, an additional initialization is provided through the instruction INIT_AVS, which initializes audio video standard (AVS) bitstream decoding. For EXP-Golomb, the EXP-Golomb coded symbols are used in CABAC and CAVLC, and hence the INIT_CTX or INIT_CAVLC instructions load the bitstream for EXP-Golomb. That is, there is no need to initialize for EXP-Golomb. For instance, for a given symbol to be decoded, an arithmetic coding flag received in the bitstream (e.g., a bit setting at the slice header level) reveals whether the symbol is EXP-Golomb coded, CABAC coded, or CAVLC coded. When EXP-Golomb coding is involved, the appropriate EXP-Golomb instruction is executed as set forth below. Although these modes affect implementation of the decoding engine, the modes also may affect the manner in which memory is initialized, utilized and updated, as described further below.

Figure 5C:
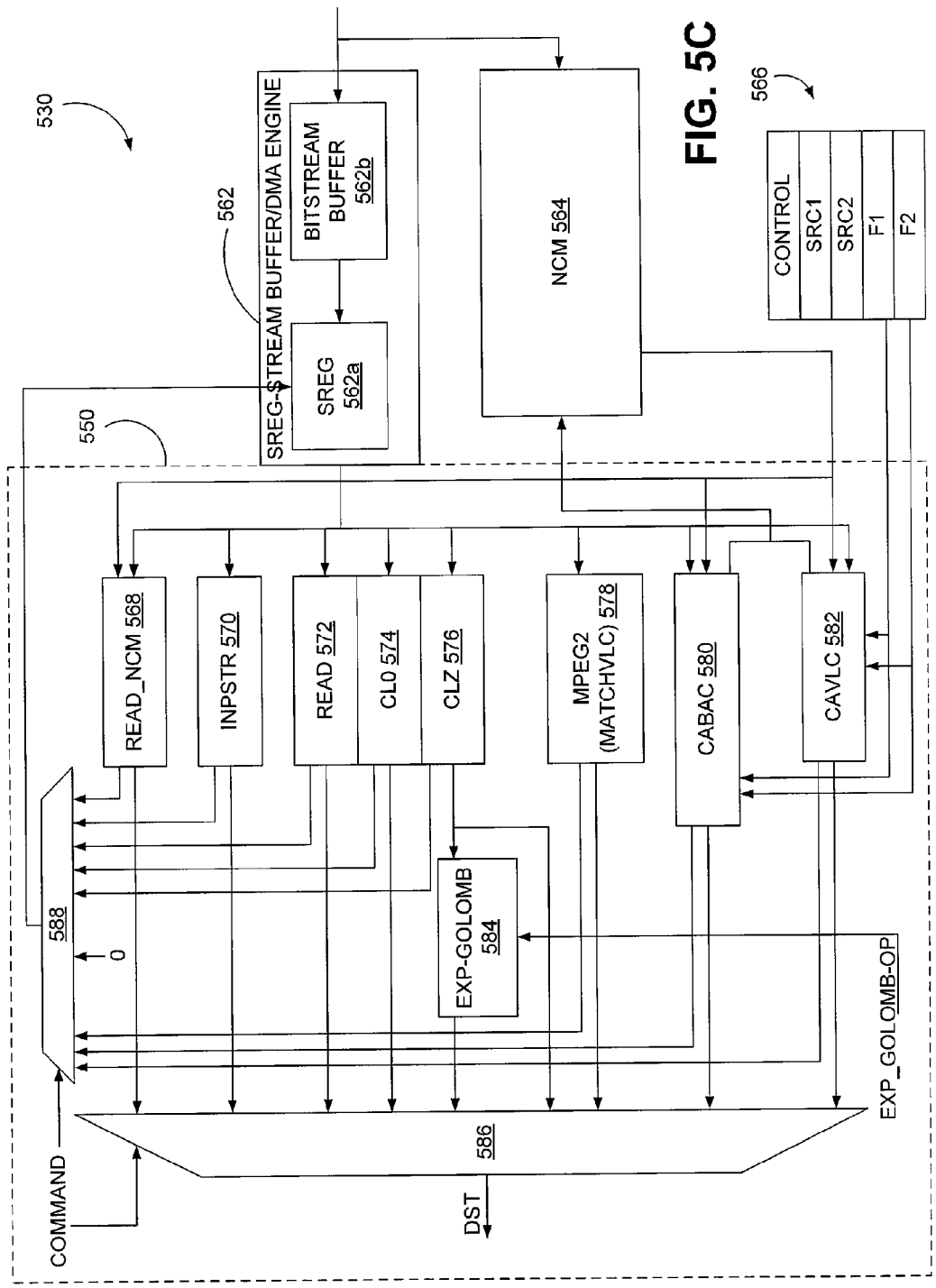
FIG. 5C is a block diagram of an embodiment of the decoding system shown in FIG. 5B that is configurable for a plurality of different codec standards, and further showing an embodiment of a corresponding bitstream buffer.

Reference is now made to FIG. 5C, which is a functional block diagram of a VLD unit 530 for carrying out one of any of a plurality of decoding operations depending on the selected mode. The VLD unit 530 comprises VLD logic 550 coupled to a bitstream buffer arrangement comprised of an SREG-stream buffer/DMA engine 562 (also referred to herein as a DMA engine module) and also coupled to a neighborhood context memory (NCM) 564 (also referred to as context memory). Also included within the VLD unit 530 are one or more registers 566, including registers for storing the decoded signal from the execution unit 420 ("control," e.g., the control signal(s) from an EU decoder to select the module in VLD logic 550 to be utilized) pertaining to selection of a given mode, operands (e.g., SRC1, SRC2), and forwarding registers (e.g., F1, F2). The SREG-stream buffer/DMA engine 562 comprises an SREG register 526a and a bitstream buffer 562b, which are explained further below.

The VLD logic 550 comprises, in one embodiment, the modules (also referred to as logic) shown in FIG. 5C. That is, the VLD logic 550 comprises hardware, including registers and/or Boolean or computational logic for executing instructions and performing decoding according to the selected mode. Explaining further, the VLD logic 550 includes a read_NCM module 568, an inspect string (INPSTR) module 570, a read module 572, a count leading ones (CLO) module 574, Count Leading Zeros (CLZ) module 576, an MPEG module 578, a CABAC module 580, a CAVLC module 582, and an Exp-Golomb module 584 coupled to the CLZ module 576. The CLZ module 576 and the CLO module 574 comprise instructions used in decoding MPEG-2 and VC-1 bitstreams. With regard to the EXP-Golomb module 584, the EXP-Golomb symbols are encoded as consisting of a number of leading zeros followed by a 1 and then a number of bits equal to the number of zeros. The CLZ module 576 detects the number of leading zeros and then removes these bits plus 1, keeping track of the number of leading zeros. The EXP-Golomb module 584 reads the number of "trailing bits" and performs a calculation to determine the value depending on the EXP_Golomb mode.

The read_NCM module 568 comprises logic corresponding to generating an address and requesting a memory read operating. In the memory read operation, a fixed number of bits are read from the NCM memory 564 and the data is output to a destination register. The read_NCM instruction effects the reading of 32-bits of data from the context memory 564 and returns the read value via multiplexer 586 to a destination register in the EU 420a. The read_NCM instruction is not used in CABAC and CAVLC implementations, although for other VLD operations (e.g., VC-1, MPEG-4 ASP (DivX)), the context memory 564 may be used for holding the VLD tables and the read_NCM instruction can be used for reading values in the tables.

The read module 572 comprises logic to read the sREG 562a and extract a specified number of bits from the most significant bits of the sREG 562a, zero-extend, and put this value into a register. Hence, the read module 572 comprises logic to execute a read operation whereby a specified number of bits are read and removed from the sREG 562a, returning the value as an unsigned number to the destination register. The INPSTR module 570 reads a fixed number of bits from the sREG 562a but does not remove any bits from the sREG 562a (e.g., does not change the pointer location), and returns the value as an unsigned number to the destination register.

Each of the modules 568-584 are coupled to a multiplexer 586 that selects a mode based on the respective command, the output from which is provided in one embodiment to the destination register for further processing. The output of modules 569-582 is also provided to multiplexer 588 which, responsive to a command, is selected and provided to the input to the SREG register 562a. Data from forwarding, control, and operand registers 566 are provided for use by the CABAC module 580 and the CAVLC module 582 during the respective operations of the same. The EXP-Golomb module 584 is enabled through reception of a control signal (designated as EXP_GOLOMB_OP in FIG. 5C). The EXP-Golomb module 584 receives input from the CLZ module 576 and provides an output to multiplexer 586. Context memory 564 is available to the CABAC module 580 and the CAVLC module 582.

For all modes except the CABAC and CAVLC modes, the read instruction effects a read of n bits from the SREG register 562a, and returns the read value via multiplexer 586 to a destination register in the execution unit 420a. For CABAC and CAVLC, the context memory 564 is used to hold the top and left context values, which are read automatically as part of the decoding process. These and other components of the VLD unit 530 are explained further below in association with the various modes. Note that in some embodiments, the VLD logic 550 may comprise fewer than (or more than) all of the modules and/or multiplexers shown.

Having described the general functionality of the VLD unit 530, the following description provides further explanation of the VLD unit 530 as configured in the various modes.

CABAC Decoding

A brief explanation of CABAC decoding in general is explained below, followed by a description of certain embodiments of a decoding system 200. In general, an H.264 CABAC decoding process can be described as comprising the parsing of an encoded bitstream for a first syntax element, initialization of context variables and the decoding engine for the first syntax element of a slice, and binarization. Then, for each bin decoding, the process comprises obtaining a context model and the decoding of bins of a respective syntax element until a match to a meaningful codeword is obtained. Explaining further, the decoding system 200 decodes syntax elements, where each syntax element may represent quantized coefficients, motion vectors, and/or prediction modes, among other parameters pertaining to a macroblock or macroblocks used to represent a particular field or frame of an image or video. Each syntax element may comprise a series of one or more binary symbols or bins, with each binary symbol decoded as a zero (0) or one (1) value. The decoding system 200 controls the output bit length according to the occurrence probability of the input binary symbols.

As is known, a CABAC encoder provides a highly efficient coding scheme when it is known that certain symbols (referred to as dominant symbols) are more likely than other symbols. Such dominant symbols may be encoded with small bit/symbol ratios. The encoder continually updates the frequency statistics of incoming data and adaptively adjusts the arithmetic and context models of the coding algorithm. The binary symbol with the higher probability is called the most probable symbol (MPS), and the other symbol is the least probable symbol (LPS). A binary symbol has associated with it a context model, with each context model corresponding to the LPS probability and a most probable symbol (MPS) value.

To decode each binary symbol, the decoding system 200 determines or receives a corresponding range, offset, and context model. The context model is selected from a plurality of possible context models based on the type of symbol and the context of decisions made for spatial neighbors (e.g., either a current macroblock or adjacent macroblocks subject to previous decoding). A context identifier can be determined through the context model and used to obtain the MPS value and the current state of the decoding engine for use in the decoding process. The range indicates an interval that is narrowed after each bin decoding.

The interval is divided into two sub-ranges corresponding respectively to the MPS value and the LPS probability. The LPS sub-range is calculated by multiplying the range and the LPS probability specified in a given context model. The MPS sub-range is calculated by subtracting the LPS sub-range from the range. The offset is a criteria for deciding a decoded bin, and is typically initialized by taking the first nine (9) bits from the encoded bitstream. For a given binary symbol decoding and context model, if the offset is less than the MPS sub-range, the bin is the MPS value and the range to be used in the next decoding is set to the MPS sub-range. Otherwise, the bin is determined to be LPS, the inversion of the MPS value contained in the associated context model, and the next range is set to the LPS sub-range. The result of the decoding process is a sequence of decoded bins, which is evaluated to determine whether the sequence matches with a meaningful codeword.

Given the general overview of the operations of the decoding system 200 as it relates to CABAC decoding, the following description sets forth an explanation of the various components of the decoding system 200 in the context of the CABAC decoding process, with the understanding that variations consistent with accepted practices of the standard are contemplated. It should be appreciated by one having ordinary skill in the art in the context of this disclosure that many of the terms used below can be found in the H.264 specification, and hence explanation of much of the same is omitted for brevity except where helpful to the understanding of the various processes and/or components described below.

Figure 6A:
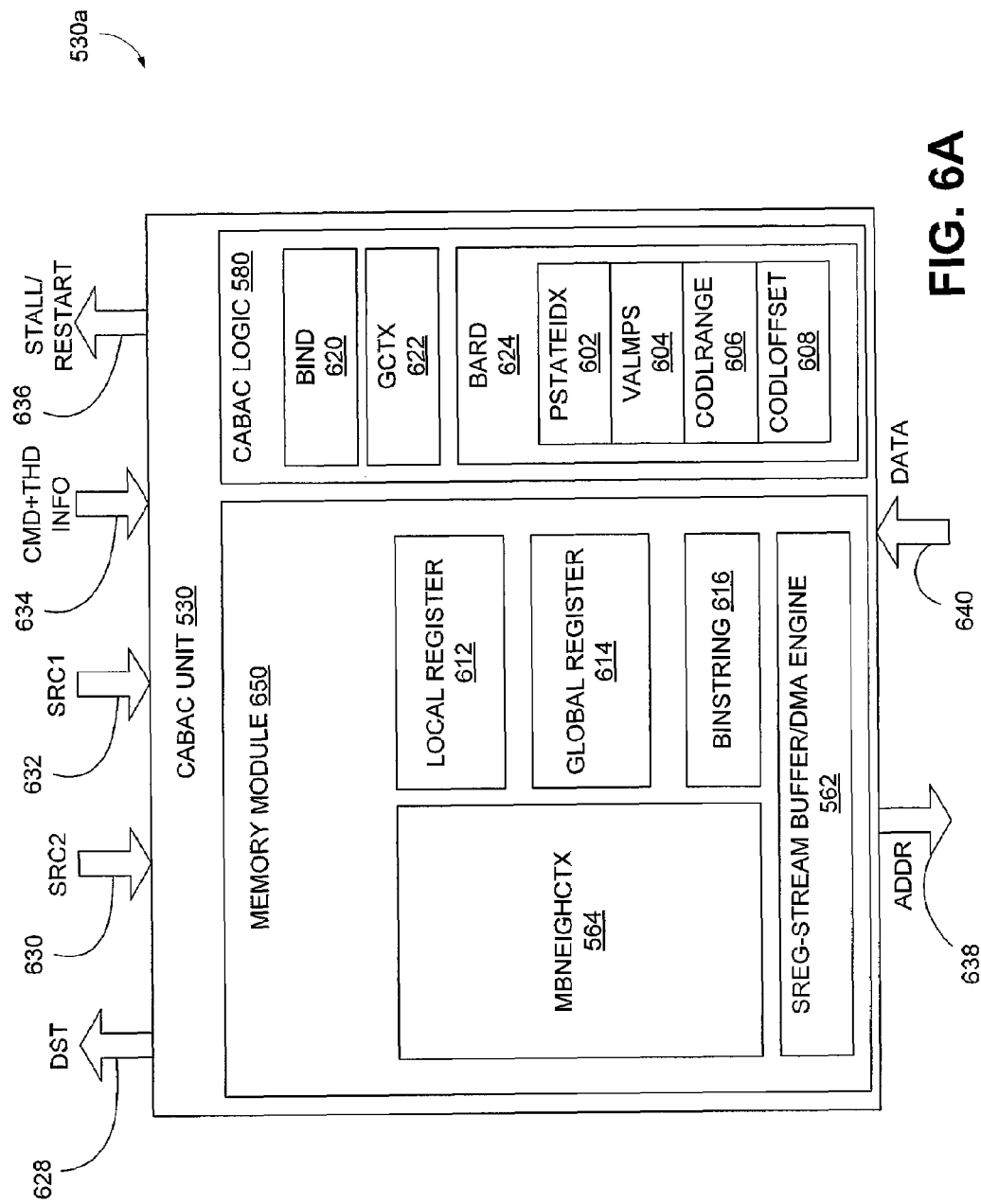
FIG. 6A is a block diagram of an embodiment of the decoding system shown in FIG. 5C configured for context-adaptive binary arithmetic coding (CABAC) decoding.
Figure 6B:
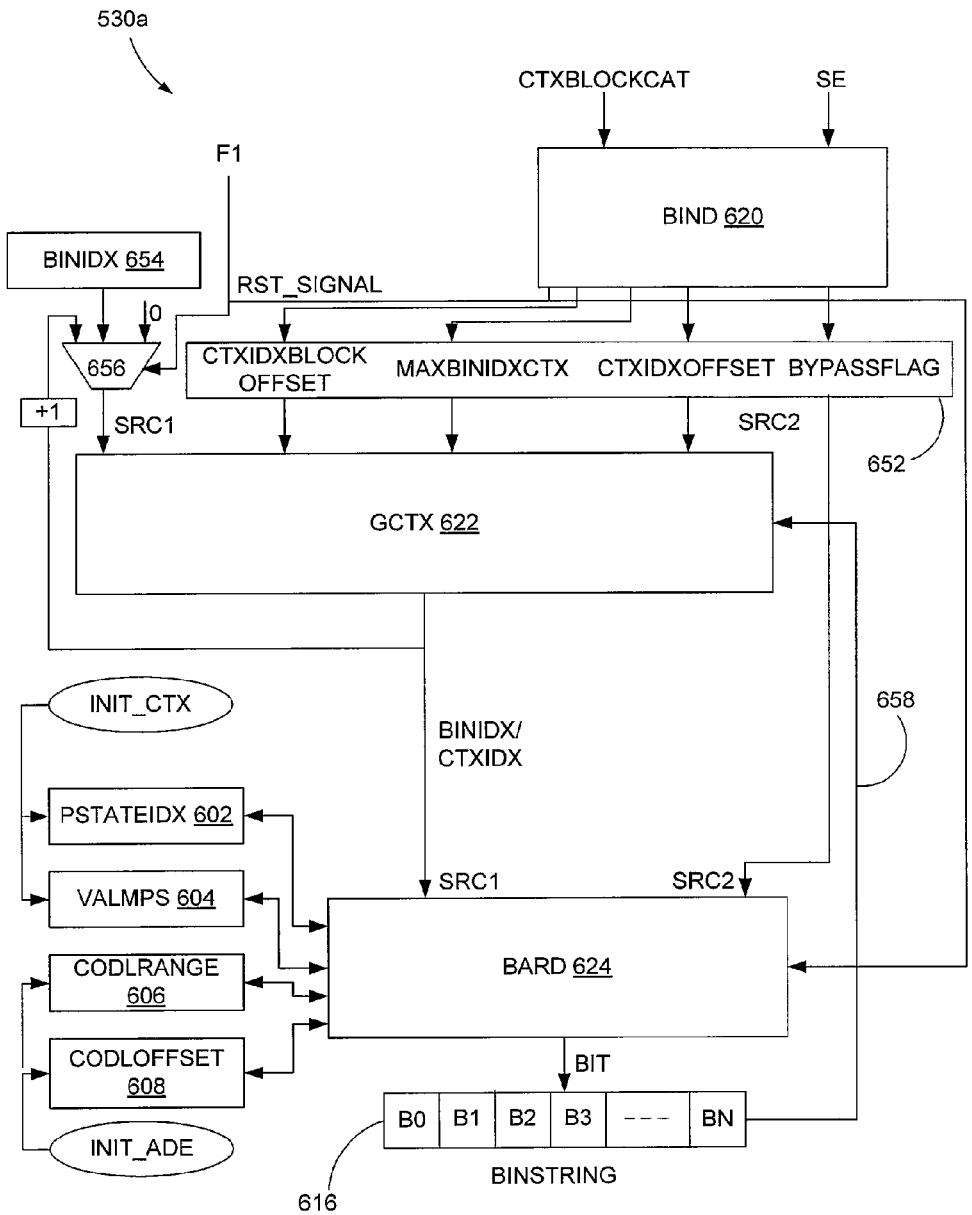
FIG. 6B is a block diagram further illustrating the decoding system shown in FIG. 6A.
Figure 6C:
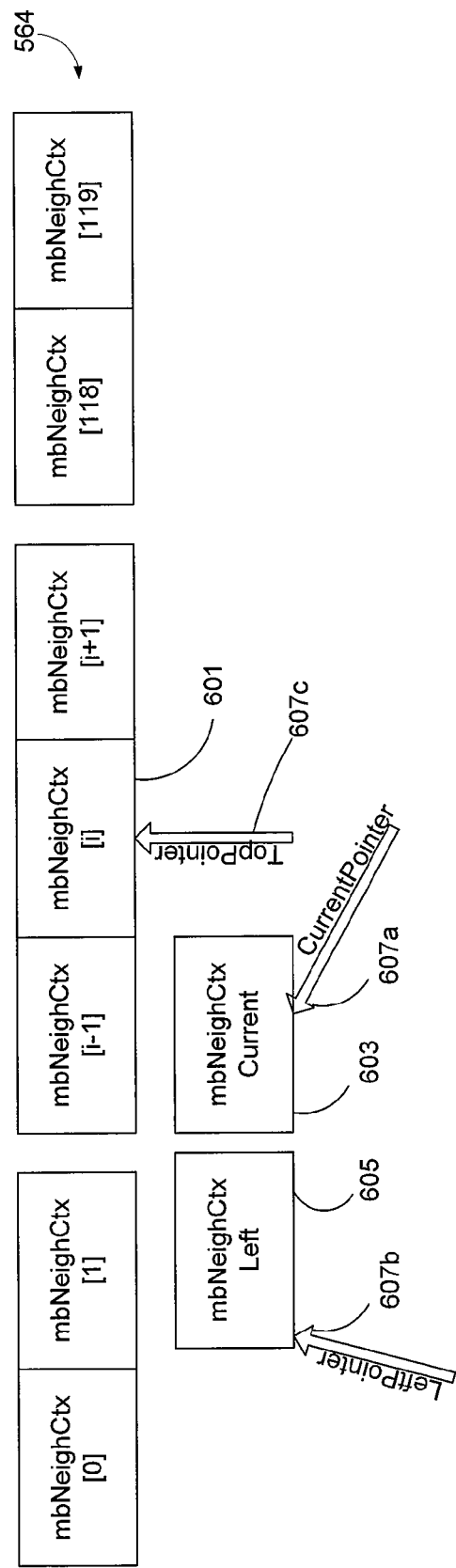
FIG. 6C is a block diagram that illustrates an embodiment of a context memory structure and associated registers of the decoding system shown in FIG. 6A.
Figure 6D:
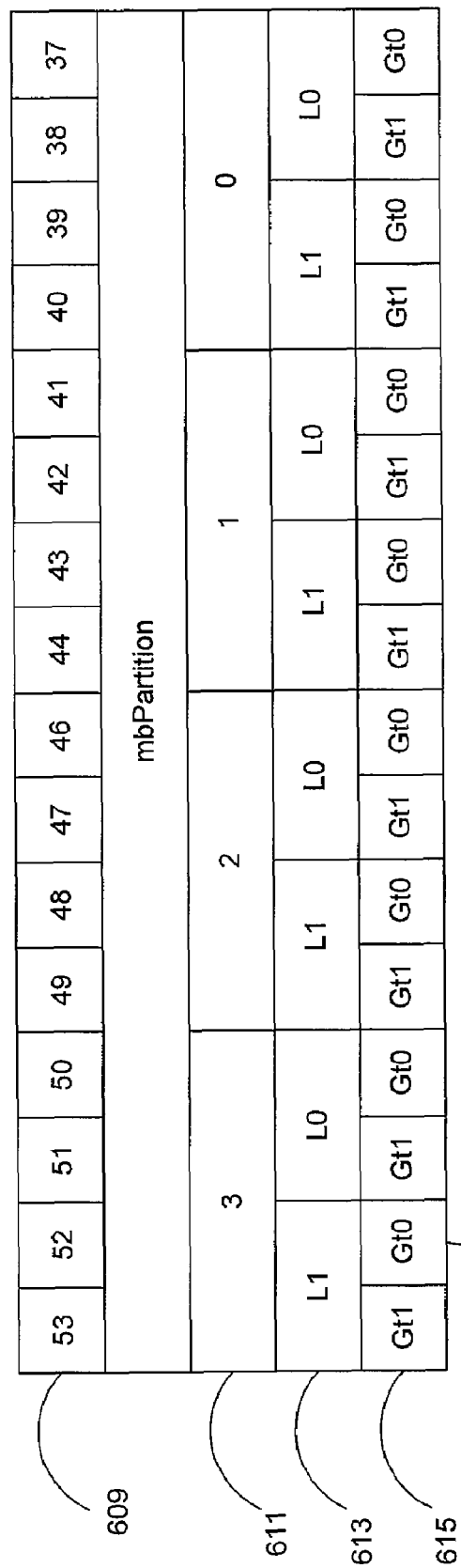
FIG. 6D is a block diagram that illustrates an embodiment of a macroblock partitioning scheme used by the decoding system shown in FIG. 6A.

FIGS. 6A-6F are block diagrams that illustrate certain embodiments of a decoding system 200 and associated components. A single VLD unit 530a is shown associated with the decoding system 200 (with the VLD unit 530a and decoding system 200 used interchangeably below in association with FIGS. 6A-6F), and hence the decoding system 200 is configured to CABAC decode a single bitstream in the illustrated embodiment. Similar principles apply to decoding systems 200 with additional VLD units used to simultaneously decode multiple (e.g., two) streams. Briefly, FIG. 6A is a block diagram of select components of the decoding system 200, and FIG. 6B is a functional block diagram of the select components shown in FIG. 6A in addition to other components. FIGS. 6C and 6E are block diagrams that illustrate context memory functionality of the decoding system 200; and FIG. 6D is a block diagram that illustrates an exemplary mechanism employed in decoding of a macroblock. It should be appreciated that although the below description is set forth in the context of macroblock decoding, the principles set forth herein also may be applied to variations in block decoding.

Referring to FIG. 6A, the VLD unit 530a comprises CABAC module 580 (also, CABAC logic) and memory module 650. The CABAC module 580 comprises, in one embodiment, three hardware modules, including a binarization (BIND) module 620, a get context (GCTX) module 622, and a binary arithmetic decoding (BARD) engine 624. The BARD engine 624 further comprises a state index (pStateIdx) register 602, MPS value (vaIMPS) register 604, code length range (codlRange) register 606, and code length offset (codlOffset) register 608. The VLD unit 530a further comprises a memory module 650, which includes the context memory 564 (also referred to herein as macroblock neighbor context (mbNeighCtx) memory or context memory array), a local register 612, a global register 614, and the SREG-stream buffer/DMA engine 562 (also referred to herein as a DMA engine module, as explained further in association with FIG. 6C), in addition to other registers not shown. In one embodiment, the mbNeighCtx memory 564 comprises an array structure, as shown in FIG. 6C and explained further below. The memory module 650 also comprises a binstring register 616.

The VLD unit 530a, at its interface to the rest of the execution unit 420a, includes a destination (DST) bus 628, two source buses, SRC1 632 and SRC2 630, a command and thread information bus 634, and a stall/reset bus 636. The data on the destination bus 628 may be communicated, directly or indirectly (e.g., through an intermediary cache, register(s), buffers, or memory), to a video processing unit internal or external to the GPU 114. The data on the destination bus 628 may be formatted in one of a plurality of different formats, including DX API formats of MICROSOFT, among others. Such data may include coefficients, macroblock parameters, motion information, and/or IPCM samples, among other data. The VLD unit 530a also includes a memory interface that comprises an address bus 638 and data bus 640. The memory interface enables access to bitstream data by providing an address via the address bus 638 for access to data received on the data bus 640. In one implementation, data on the data bus 640 may include a non-encrypted video stream comprising various signal parameters, among other data and formats. In some embodiments, a load-store operation can be used to provide access to the bitstream data.

Before commencing description of the various components of the VLD unit 530a, a brief overview is presented that relates CABAC decoding to the overall operation of the execution unit 420a. In general, based on the slice type, the driver software 128 (FIG. 1) prepares and loads a CABAC shader to the execution unit 420a. This CABAC shader uses standard instruction sets plus BIND, GCTX and BARD instructions to decode a bitstream. Since the context table used by the VLD unit 530a may change depending on the slice type, loading occurs for each slice. In one embodiment, the first instructions executed by the CABAC shader include an INIT_CTX and INIT_ADE before other instructions are issued. These two latter instructions, explained further below, initialize the VLD unit 530a to decode a CABAC bitstream and load the bitstream into a FIFO buffer from which point the stream decoding is managed automatically.

With regard to the parsing of the bitstream, the bitstream is received at the memory interface over the data bus 640 and buffered at the SREG-stream buffer/DMA engine 562. Bitstream decoding is provided from the stage of slice data parsing. That is, a bitstream, such as an NAL bitstream, comprises one or more pictures that are broken-up into a picture header and slices. A slice generally refers to a sequence of macroblocks. In one embodiment, an external process (i.e., external to the VLD unit 530a) parses the NAL bitstream, decoding the slice header and passing on the pointer to the location of the slice data (e.g., where the slice starts). The hardware (plus software) is capable of parsing the H264 bitstream from the picture level. However, in one embodiment, CABAC coding is only present from the slice data and macroblock level. Generally, the driver software 128 processes the bitstream from slice data level because of the expectation of the applications and the APIs provided. The passing along of the pointer to the location of the slice data involves the address of the first byte of the slice data (e.g., RBSPbyteAddress) and a bit offset indicator (e.g., one or more bits) to indicate the position of the start or head of the bitstream (e.g., sREGptr). This initialization of the bitstream is explained further below. In some embodiments, the external process may be implemented by a host processor (e.g., CPU 126, FIG. 1) to provide for picture-level decoding and slice-header decoding. In some embodiments, due to the programmable nature of the decoding system 200, decoding may be implemented at any level.

Referring to FIGS. 5C and 6A, the SREG-stream buffer/DMA engine 562 is configured to receive SRC1 and SRC2 values on buses 632 and 630, respectively, and data corresponding to forwarding registers and control registers. The SREG-stream buffer/DMA engine 562 comprises an internal bitstream buffer 562b that in one embodiment includes a 32-bit register and eight 128-bit (8×128) registers configured in, for instance, BigEndian format. The SREG-stream buffer/DMA engine 562 is initially set-up through the driver software 128 issuing an initialization instruction as explained below. Once initiated, the internal buffer 562b of the SREG-stream buffer/DMA engine 562 is largely managed automatically. The SREG-stream buffer/DMA engine 562 is used to maintain the location of the bits to be parsed. The SREG-stream buffer/DMA engine 562 in one embodiment uses two registers, a fast 32-bit flip-flop and slower 512 or 1024 bit memory. The bitstream is consumed in bits. The sREG register 562a (herein, also simply sREG) operates on the bit level and the bitstream buffer 562b on the byte level, which helps to save on power. In general, instructions operate on the sREG register 562a and consume a few bits (e.g., 1-3 bits). When more than one byte of data has been consumed from the sREG 562a, then data (in byte chunks) is provided to the sREG 562a from the bitstream buffer 562b, and a buffer pointer is decremented by the number of bytes transferred. When 256-bits or more have been consumed, then the DMA of the SREG-stream buffer/DMA engine 562 detects this event, and fetches 256-bit from memory to refill the bitstream buffer 562b. Thus, a simple circular buffer (256-bit chunks×4) is implemented by the VLD unit 530a to keep track of the bitstream buffer 562b and provide replenishment. In some embodiments, a single buffer may be used, however typically at the expense of implementing a circular buffer with more complex pointer arithmetic at the speed of the memory.

Interaction with the internal buffer 562b may be accomplished through the use of an initialization instruction, herein referred to as an INIT_BSTR instruction. In one embodiment, the INIT_BSTR instruction, as well as the other instructions described below, are issued by the driver software 128. Given the byte address and the bit-offset of the bitstream location, the INIT_BSTR instruction loads the data into the internal bitstream buffer 562b and starts the process of managing it. For each call to process slice data, the following instruction with the following format is issued:

INIT_BSTR offset, RBSPbyteAddress

This instruction is issued to load the data into the internal buffer 562b of the SREG-stream buffer/DMA engine 562. The byte address (RBSPbyteAddress) may be provided via the SRC2 register and the bit offset via the SRC1 register. Thus, one generic instruction format may be provided as follows:

INIT_BSTR SRC2, SRC1, where SRC1 and SRC2 in this instruction, and others provided below, correspond to values within internal registers 566, though not limited to these registers. The memory fetch used to access the bitstream data, in one embodiment, is 256-bit aligned, which is written into buffer registers and transferred to the 32-bit SREG 562a of the SREG-stream buffer/DMA engine 562. In one implementation, data in the bitstream buffer 562b is byte-aligned before any other operations on these registers or buffers can be performed. The alignment of the data may be implemented through the use of an alignment instruction, referred to herein as an ABST instruction. The ABST instruction aligns the data in the bitstream buffer 562b, where alignment bits (e.g., stuffed bits) are eventually discarded during the decoding process.

As data is consumed from the SREG 562a, it is replenished by the internal buffer 562b. In other words, the internal buffer 562b of the SREG-stream buffer/DMA engine 562 acts as a circular buffer of modulo three that feeds the 32-bit register 562a of the SREG-stream buffer/DMA engine 562. The CABAC module 580, in cooperation with the read module 572, may utilize a READ instruction to read data from the SREG register 562a. For instance, in H.264, some symbols are fixed length coded and the value is obtained by performing a "READ" of these specified number of bits and zero-extending to the size of the register. The READ instruction may have the following format:

READ DST, SRC1, where DST corresponds to an output or destination register. In one embodiment, the SRC1 register comprises an unsigned integer value, n. That is, under the READ instruction, n-bits are read from the sREG 562a. When 256-bits of data are consumed (e.g., when one or more syntax elements are decoded) from the 32-bit register 562a, a fetch is automatically initiated to get another 256-bit of data to write to registers in the internal buffer 562b for subsequent entry into the SREG 562a for consumption.

In some embodiments, if the data in the SREG 562a corresponding to a symbol decode has been consumed to a predefined number of bits or bytes, and no data has been received in the internal buffer 562b, the CABAC module 580 can implement a stall via a stall/reset bus 636, enabling the execution of another thread (e.g., a thread unrelated to CABAC decoding processing), such as for a vertex shader operation.

The operations of the DMA engine of the SREG-stream buffer/DMA engine 562 minimize total buffer requirements to compensate for memory latency (e.g., can be 300 plus cycles in some graphics processor units). As a bitstream is consumed, requests are made to stream-in further bitstream data. If the bitstream data is low and the bitstream buffer 562b at risk of underflow (e.g., given the number of cycles for signals to flow from the VLD unit 530a to the processor pipeline), stall signals can be passed to the processor pipe to cause a halt in operations until data arrives in the bitstream buffer 562b.

Additionally, the SREG-stream buffer/DMA engine 562 inherently provides an ability to handle a corrupted bitstream. For instance, it is possible that, due to corruption of the bitstream, end-of-slice markers may not be detected. Such failure in detection can result in a completely wrong decode result and consumption of bits from future pictures or slices. The SREG-stream buffer/DMA engine 562 keeps track of the number of bits consumed. If the number of bits consumed is larger than a defined (e.g., programmable per slice) amount or threshold, then processing stops and an exception signal is sent to the processor (e.g., host processor). Code can then be executed on the processor to attempt to recover from the corruption.

With continued reference to FIG. 6A, FIG. 6B provides a further illustration of the functionality of the VLD unit 530a, and in particular, the initialization of the decoding engine (e.g., BARD engine or module 624) and the context variables. At the start of a slice and before decoding a syntax element corresponding to a first macroblock, the context states and the BARD module 624 are initialized. In one embodiment, this initialization is performed upon issuance by the driver software 128 using two instructions, INIT_CTX and INIT_ADE.

The INIT_CTX instruction effects commencement of a CABAC decoding mode and initializes one or more context tables (e.g., stored remotely or in on-chip memory, such as ROM). The INIT_CTX instruction may be implemented according to the following exemplary instruction format:

INIT_CTX SRC2, SRC1

For the INIT_CTX instruction, operand SRC1 can take on the following values, one or more of which pertain to known H.264 macroblock parameters, depending on the bit location: cabac_init_idc, mbPerLine, constrained_intra_pred_flag, NAL_unit_type (NUT), and MbaffFlag. Note that constrained_intra_pred_flag, NAL_unit_type (NUT), and MbaffFlag correspond to known H.264 macroblock parameters. In addition, operand SRC2 can take on the following values depending on the bit location: SliceQPY, and mbAddrCurr. Explaining further, for the execution of the INIT_CTX instruction (i.e., initialization of the CABAC context table), in one embodiment, the cabac_init_idc and sliceQPY (e.g., quantization) parameters are needed. However, to initialize the entire CABAC engine, three instructions are utilized, namely: INIT_BSTR, INIT_CTX, and INIT_ADE. Thus, bits available in the SRC1, SRC2 (e.g., 64-bits total, or 32-bits each) are used to pass the other parameters which are used for the working of the CABAC neighborhood context. Thus, the two source registers SRC1 and SRC2 may contain the following values:

```
SRC1[15:0] = cabac_init_idc,
SRC1[23:16] = mbPerLine
SRC1[24] = constrained_intra_pred_flag
SRC1[27:25] = NAL_unit_type (NUT)
SRC1[28] = MbaffFlag
SRC1[31:29] = Undefined
SRC2[15:0] = SliceQPY
SRC2[31:16] = mbAddrCurr
```

The SliceQPY value is used to initialize a state machine (not shown) implemented in the bitstream buffer 562b.

Although the various aforementioned parameters are known as picture and slice level parameters, additional discussion for a few of the parameters specific to the VLD unit 530a is provided below. In one embodiment, cabac_init_idc is defined for slices which are not coded as an I-picture (I) and switching I picture (SI). In other words, cabac_init_idc may be defined only for P and SP and B-slices, and when I and SI slices are received, a default value is provided for cabac_init_idc. For instance, in an implementation where approximately 460 contexts are initialized (e.g., for I and SI slices), cabac_init_idc may be set to three (3) (e.g., since according to the H.264 specification, cabac_init_idc may only have values 0 ... 2), enabling two bits to indicate that the slice is I or SI.

The INIT_CTX instruction is also used by the VLD unit 530a to initialize the local register 612 and mbNeighCtx 564 array structures or elements, including registers pertaining to the temporary storage of spatially adjacent macroblocks. Referring to FIG. 6C, one embodiment of the mbNeighCtx memory 564 is shown at the top of the diagram. The mbNeighCtx memory 564 comprises a macroblock-based neighborhood context memory arranged in one embodiment as a memory array to store data relating to a row of macroblocks. The mbNeighCtx memory 564 is shown as comprising array elements mbNeighCtx[0, 1, i−1, i, i+1, . . . 119] 601, each element for storing one of 120 macroblocks in a row (e.g., corresponding to HDTV at 1920×1080 pixels). Also shown are registers mbNeighCtxCurrent 603 for storing a currently decoded macroblock, and mbNeighCtxLeft 605 for storing a previously decoded, neighboring (left) macroblock. Additionally, the registers 603, 605 and array element 601 are referenced using pointers 607a, 607b, and 607c (each represented symbolically by an arrow in FIG. 6C). To decode a current macroblock, the decoded data is stored in mbNeighCtxCurrent 603. Given the contextual nature of CABAC decoding, decoding of the current macroblock is based on information gleaned from previously decoded macroblocks, namely the left macroblock stored in mbNeighCtxLeft 605 and pointed to by pointer 607b and the top macroblock stored in the array element (referenced as "i") 601 and pointed to by pointer 607c.

Continuing with an explanation of the initialization instruction, the INIT_CTX instruction is used to initialize top and left pointers 607c and 607b pertaining to macroblocks adjacent to the current macroblock (e.g., elements in the array of mbNeighCtx memory 564). For instance, the left pointer 607b may be set to zero (0) and the top pointer 607c at mbPerLine may be set to one (1). Additionally, the INIT_CTX instruction updates the global register 614.

With regard to the initialization of a context table, responsive to a call to INIT_CTX, the VLD unit 530a sets up one or more context tables, also referred to as a CTX_TABLE(s). In one embodiment, the CTX_TABLE may be configured as a 4×460×16-bit (8-bits for m and another 8-bits for n, signed values) table or other data structure. Each entry of the CTX_TABLE comprises values for pStateIdx and valMPS accessed from registers pStateIdx 602 and valMPS 604.

The INIT_ADE instruction initializes the BARD module 624, also referred to herein as a decoder engine. In one implementation, the call to INIT_ADE is made subsequent to the completion of an INIT_BSTR instruction. As a result of the execution of the INIT_ADE instruction, the VLD unit 530a sets up the two registers, codIRange 606 and codIOffset 608, with the following instructions or values:

```
codIRange = 0x01FE, and
codIOffset = ZeroExtend (READ(#9), #16)
```

Thus, in one embodiment, both of these variables may be held as 9-bit values. Referring to the codIOffset instruction, 9-bits are read from the bitstream buffer 562b and zero-extended for storage in, for instance, the 16-bit codIOffset register 608. Other values may be used in some embodiments. The BARD module 624 uses the values stored in these registers 606, 608 to determine whether to output a zero (0) or one (1), and after the decoding of a given bin, these values are updated.

In addition to initializing the codIRange 606 and codIOffset 608 registers, the INIT_ADE operation also initializes the binstring register 616. In one embodiment, the binstring register 616 may be configured as a 32-bit register that receives each output bit from the BARD module 624. In some embodiments, other register sizes may be used.

The BARD module 624 is also initialized when a macroblock is coded I_PCM. As is known, I_PCM data comprises pixel data where no transformation or prediction model has been applied to the raw video data according to the H.264 specification. For instance, I_PCM may be used for lossless coding applications.

Having described the architecture and instructions involved in the parsing of the bitstream and the initialization of various decoding system components, one or more processes involved in binarization, obtaining of model information and a context, and decoding based on the model and context is described below. In general, the VLD unit 530a is configured to obtain all possible binarizations for the parsed syntax element (SE), or at least enough to obtain model information, through the BIND module 620 and BIND instruction. The VLD unit 530a further obtains a context for the given syntax element via the GCTX module 622 and GCTX instruction, and implement arithmetic decoding based on the context and model information via the BARD module 624 and BARD instruction. In effect, a loop is implemented on calls to GCTX/BARD instructions, outputting one bit to the binstring register 616 until a meaningful codeword match for a given syntax element is found. That is, in one embodiment, every time a bin is decoded, a corresponding decoded bit is provided to the binstring register 616, and the binstring register is read back to the GCTX module 622 until a match is found.

Explaining the decoding system architecture in more detail in the context of a single VLD unit 530a, and with continued reference to FIGS. 6A and 6B, the BIND module 620 is enabled through a BIND instruction issued by the driver software 128. In one embodiment, the BIND instruction comprises the following exemplary format:

BIND DST, #Imm16, SRC1, where DST corresponds to DST register 652, and #Imm16 corresponds to 16-bit immediate value and SRC1 correspond to input register SRC1. The input to the BIND operation comprises a syntax element (SE), which comprises a 16-bit immediate value, "Imm") and a context block category (ctxBlockCat). The syntax element may comprise any of well-known syntax element types as defined under the H.264 standard (e.g., MBTypeInI, MBSkipFlagB, IntraChromaPredMode, etc.). A call to the BIND instruction results in the driver software 128 reading the syntax element from a table (or other data structure) stored in memory (e.g., on-chip or remote memory) and obtaining a syntax element index (SEIdx). The syntax element index is used to access other tables or data structures to obtain various macroblock parameters as described below.

The DST register 652 comprises, in one embodiment, a 32-bit register having the following format: bits 0-8 (ctxIdxOffset), bits 16-18 (maxBinIdxCtx), bits 21-23 (ctxBlockCat), bits 24-29 (ctxIdxBlockOffset), and bit 31 (bypass flag). These values (e.g., ctxIdxOffset, maxBinIdxCtx, etc.) are passed to the GCTX module 622 for use in context modeling. Any remaining bits are undefined and may be read as zero is this particular implementation. The ctxIdxBlockOffset may be derived through a table, or other data structure, stored remotely or in on-chip memory, based on matching the same with the syntax element index and ctxBlockCat. A representation of the content is such a table is illustrated as a non-limiting example In Table 1 below:

TABLE 1

| codeNum (k) | Coded_block_pattern | |
| --- | --- | --- |
| | Intra_4x4 | Inter |
| 0 | 47 | 0 |
| 1 | 31 | 16 |
| 2 | 15 | 1 |
| 3 | 0 | 2 |
| 4 | 23 | 4 |
| 5 | 27 | 8 |
| 6 | 29 | 32 |
| 7 | 30 | 3 |
| 8 | 7 | 5 |
| 9 | 11 | 10 |
| 10 | 13 | 12 |
| 11 | 14 | 15 |
| 12 | 39 | 47 |
| 13 | 43 | 7 |
| 14 | 45 | 11 |
| 15 | 46 | 13 |
| 16 | 16 | 14 |
| 17 | 3 | 6 |
| 18 | 5 | 9 |
| 19 | 10 | 31 |
| 20 | 12 | 35 |
| 21 | 19 | 37 |
| 22 | 21 | 42 |
| 23 | 26 | 44 |
| 24 | 28 | 33 |
| 25 | 35 | 34 |
| 26 | 37 | 36 |
| 27 | 42 | 40 |
| 28 | 44 | 39 |
| 29 | 1 | 43 |
| 30 | 2 | 45 |
| 31 | 4 | 46 |
| 32 | 8 | 17 |
| 33 | 17 | 18 |
| 34 | 18 | 20 |
| 35 | 20 | 24 |
| 36 | 24 | 19 |
| 37 | 6 | 21 |
| 38 | 9 | 26 |
| 39 | 22 | 28 |
| 40 | 25 | 23 |
| 41 | 32 | 27 |

TABLE 1-continued

| | Coded_block_pattern | |
|---|---|---|
| codeNum (k) | Intra_4x4 | Inter |
| 42 | 33 | 29 |
| 43 | 34 | 30 |
| 44 | 36 | 22 |
| 45 | 40 | 25 |
| 46 | 38 | 38 |
| 47 | 41 | 41 |

If a received ctxBlockCat is undefined, the VLD unit 530a may treat such an undefined parameter as zero, such that the ctxIdxBlockOffset is considered to have a zero value.

A call to BIND also results in a reset signal (e.g., Rst_Signal) being sent out to the BARD module 624 from the BIND module 620, as explained further below.

Given the explanation of the various inputs to and outputs from the BIND module 620, operation of the BIND module 620 according to at least one embodiment is now set forth. Given a call to the BIND module 620, the BIND module 620 extracts the syntax element and through software is provided the given syntax element index (SEIdx). Using the syntax element index, the BIND module 620 performs a table lookup to obtain corresponding values for maxBinIdxCtx, ctxIdx-Offset, and bypassFlag. These looked-up values are temporarily stored in predefined bit allocations in DST register 652. Additionally, using the syntax element index and the ctxBlockCat, the BIND module 620 performs a second table lookup (e.g., in remote or on-chip memory) to obtain a value for ctxIdxBlockOffset. This second looked-up value is also temporarily stored in the DST register 652. Thus, the determined values are used to construct the DST register 652 for use as a 32-bit value output destination.

For some syntax elements, additional information (in addition to the syntax element and ctxBlockCat) may be used to enable H.264 decoding operations. For instance, for macroblock parameters such as SigCoeffFlag and lastSigCoeffFlag, the value in array element mbNeighCtx [1] of the mbNeighCtx memory 564 and the input ctxBlockCat value are used to determine whether the macroblock is field or frame coded. Note that there exists different coding for sigCoeffFlag and lastSigCoeffFlag depending on whether the picture is field or frame coded. In certain embodiments, the same syntax element number is used for these flags even though they are different, and then the mb_field_decoding_flag (mbNeighCtx [1] field) is used to distinguish between them.

In addition to the functionality presented above in association with the BIND module 620, it is noted from FIG. 6B that the BIND module 620 works in conjunction with a binIdx register 654 and multiplex unit 656 and/or forwarding registers F1 and F2 (not shown). With regard to the binIdx register 654 and multiplex unit 656, based on various input, the multiplex unit 656 provides an output SRC1 (e.g., the value in temporary register SRC1) to the GCTX module 622.

With regard to the forwarding registers, such as that represented by F1, when the BIND (or GCTX) instructions produce a result, the result may be written to both a destination register, such as the DST register 652, and/or to a forwarding register F1. Whether an instruction, and hence corresponding module (e.g., GCTX module 622 or BARD module 624), uses a forwarding register F1, F2 is indicated by forwarding flags in the given instruction. Symbols to represent the forwarding registers may include F1 (i.e., forwarded source 1 value is to be used, which in one embodiment may be indicated by bit 26 in the instruction) and F2 (i.e., forwarded source 2 value is to be used, which in one embodiment may be indicated by bit 27 in the instruction). For the GCTX module 622 and the BARD module 624, the data may be forwarded to their respective input as explained further below.

Given the above-description of the BIND module 620 and related processes, the obtaining of a context for a given model and bin index is set forth below with regard to the GCTX module 622 under the direction of the GCTX instruction. Briefly, the input to the GCTX module 622 includes maxBinIdxCtx, binIdx, and CtxIdxOffset, as described below. The GCTX module 622 uses the CtxIdxOffset and binIdx values to compute a CtxIdx value (an output, which is a context Index).

One exemplary format for the GCTX instruction comprises the following:

GCTX DST, SRC2, SRC1, where SRC1 corresponds to the value output from the multiplex unit 656 and stored in temporary register SRC1, SRC2 corresponds to the values output from the DST register 652 and stored in temporary register SRC2, and DST corresponds to a destination register. In one embodiment, the various registers may take on the following values:

SRC1 [7:0]=binIdx; that is, the value provided in SRC1 (output from the multiplex unit 656 and hence used as an input of the GCTX module 622) may be the value in the binIdx register 654 if the current syntax element comprises a codedBlockPattern.

SRC1 [15:8] may be levelListIdx when computing sigcoeffFlag, lastSigCoeffFlag, or mbPartIdx when computing Ref_Idx or binIdx for a coded block pattern. That is, the multiplex unit 656 may be used to convey levelListIdx when the syntax element is either the sigCoeffFlag or lastSigCoefFlag.

SRC1 [16] may contain an iCbCr flag, and when zero (0), the block is a Cb chroma block. Additionally, SRC1 [16] may contain the value L0/L1, and when L0, the value is zero (0). As would be understood by one having ordinary skill in the art in the context of the present disclosure, L0/L1 refer to the picture reference lists (L0=list0, L1=list1) used in motion compensation prediction.

SRC1 [21:20] = mbPartitionMode
SRC2 [8:0] = ctxIdxOffset
SRC2 [18:16] = maxBinIdxCtx
SRC2 [23:31] = ctxBlockCat
SRC2 [29:24] = ctxIdxBlockOffset
SRC2 [31] = bypassFlag Further, DST comprises the output of the GCTX module 622, and takes on the following values:

DST [15:00] = ctxIdx
DST [ 23:16] = binIdx
DST [ 27:24] = mbPartIdx
DST [29:28] = mbPartitionMode
DST [30] = L0

The GCTX module 622 may also interact with forwarding registers, and hence instructions where forwarding registers are used may take on the format of GCTX.F1.F2, where F1 and F2 indicate forwarding registers are used. That is, there are two bits in the instruction coding (F1 and F2). If one or both of the forwarding flags are missing, this absence indicates which forwarding register is not utilized. If these bits are set (e.g., set to 1), then the forwarded register value (value generated internally) is used. Otherwise, the source register value is used. Thus, this forwarding register feature provides a hint to the compiler as to when the earliest the instruction may be issued. If forwarding is not used, then the instruction may experience read-after-write latency of the given source register.

For the GCTX instruction, if the reset signal Rst_Signal is set, then the SRC1 value is 0. If (F1 & rst_signal), then the binIdx value from inside the GCTX unit 622 but incremented by 1 is SRC1, otherwise SRC1 is the binIdx value from an EU register. The output of the BIND module 620 may be used as a forwarded SRC2 value for both the GCTX and BARD instructions. In this latter instance, a BIND instruction may not be issued until the BARD instruction has consumed the forwarded register. Explaining further, the Rst_Signal and the F1 forwarding signal are combined into a single (e.g., 2-bit signal) signal as {F1,reset} that dictates whether the SRC1 value input to the GCTX module 622 comprises the binIdx value or the forwarded value. Another effect of providing the Rst_Signal is that the binstring register 616 is cleared and reset, and the binIdx register 654 is reset to zero.

Continuing the discussion of the GCTX module 622 and obtaining context information, in one embodiment, the following information shown below in Tables 2 and 3 correspond to the values for structures mbNeighCtx memory 564 and register mbNeighCtxCurrent 603, respectively. The mbNeighCtxCurrent 603, as explained above, contains the decoding output result of a current macroblock. At the end of processing a current macroblock, a CWRITE instruction is issued, which copies information from mbNeighCtxCurrent 603 to the corresponding location in the mbNeighCtx memory 564 array. Such copied information is used later as the top neighborhood values.

TABLE 2

| Parameter | Size (bits) | |
|---|---|---|
| transform_size_8x8_flag | 1 | 0 |
| mb_field_decode_flag | 1 | 1 |
| mb_skip_flag | 1 | 2 |
| Intra_chroma_pred_mode | 2 | 4:3 |
| mb_type | 3 | 7:5 |
| codedBlockPatternLuma | 4 | 11:8 |
| codedBlockPatternChroma | 2 | 13:12 |
| codedFlagY | 1 | 14 |
| codedFlagCb | 1 | 15 |
| codedFlagCr | 1 | 16 |
| codedFlagTrans | 8 | 24:17 |
| refIdx | 8 | 32:25 |
| predMode | 4 | 36:33 |

TABLE 3

| Parameter | Size (bits) | |
|---|---|---|
| transform_size_8x8_flag | 1 | 0 |
| mb_field_decode_flag | 1 | 1 |
| mb_skip_flag | 1 | 2 |
| Intra_chroma_pred_mode | 2 | 4:3 |
| mbQpDeltaGT0 | 1 | 88 |
| codedBlockPatternLuma | 4 | 11:8 |
| codedBlockPatternChroma | 2 | 13:12 |
| codedFlagY | 1 | 14 |
| codedFlagCb | 1 | 15 |
| codedFlagCr | 1 | 16 |
| codedFlagTrans | 24 | 87:64 |

TABLE 3-continued

| Parameter | Size (bits) | |
|---|---|---|
| refIdx | 16 | 52:37 |
| predMode | 8 | 60:53 |
| mb_type | 3 | 63:61 |

The codedFlagTrans, in one embodiment, is divided into three sections. For instance, the first 4-bits relate to when ctxBlockCat is 0 or 1, the upper 4-bits relate to when ctxBlockCat is either 3 or 4. The upper 4-bits are further divided into two parts, with the lower 2 bits for iCbCr=0 and the other 2 bits for iCbCr=1. The predMode (prediction mode) has one of the following three options: predL0=0, predL1=1, NiPred=2.

One embodiment of a structure for refIdx referenced in Tables 2 and 3 above is shown in FIG. 6D. Note that refIdx refers to the index to the list of reference pictures used in the reconstruction of a picture. Such a structure provides for an optimization in terms of memory and logic. As shown, the refIdx structure comprises a top row of macroblocks 609, macroblock partitions 611 (e.g., four shown), L0/L1 values 613, and stored bit values Gt0 (greater than 0) 615 and Gt1 (greater than 1) 617 for each L0 and L1 value. In general, access is needed to the top neighbor macroblock 609, though all that is required is the bottom row of the macroblock, which has been subdivided in one embodiment into 4×4 squares, resulting in four mbPartitions 611. For each partition 611, knowledge of the values for L0/L1 613 is to be ascertained, but not the actual values. That is, a determination is made as to whether the L0 and L1 values are either 1 or larger than 1. In one embodiment, this determination is achieved by storing two bits: Gt0 615 and Gt1 617, which are used in the calculation of syntax elements (refIdx).

Explaining the benefit of the refIdx structure further, two optimizations are performed. In one optimization, only 2-bits are held (although the reference value is typically larger), and more bits are unnecessary for the decoding of refIdx in the VLD unit 530a. The full value is decoded and held in an EU register or memory (e.g., L2 cache 408). A second optimization is that only four elements are held (e.g., two on the left and two on the top). These four elements are recycled and the final values are written to the neighbors by the CWRITE instruction, which saves in memory since only 16 bits are held in the mbNeighCtxCurrent register 603 and only 8-bits in the mbNeighCtxLeft register 605 and the top mbNeighCtx element 601 of the array 564. Further savings are realized in computation logic since full arithmetic for the decoded reference values is replaced by few-bit Boolean operations.

The mb_type of interest comprises the following shown in Table 4 below:

TABLE 4

| Mb_type | Name |
|---|---|
| 4'b000 | SI |
| 4'b001 | I_4x4 or I_NxN |
| 4'b010 | I_16x16 |
| 4'b011 | I_PCM |
| 4'b100 | P_8x8 |
| 4'b101 | B_8x8 |
| 4'b110 | B_Direct_16x16 |
| 4'b111 | Others |

Additional registers not shown in, or discussed in association with, FIG. 6B may be used, such as mbPerLine (e.g., 8-bit unsigned), mb_qp_delta (8-bit signed), and mbAddrCurr (16-bit, current macroblock address). Note that for mbAddrCurr, a 1920×1080 array is implemented, where although only 13-bits are needed, some embodiments may use 16-bits to facilitate performance of 16-bit arithmetic.

The values from the above-described registers (e.g., mbPerline, mbAddrCurr and mb_qp_delta) are also stored in the global register 614. That is, copies of these values stored in the global register 614 are stored in registers to facilitate hardware design. The global register 614 comprises, in one embodiment, a 32-bit register formatted to include values corresponding to mbPerline, mbAddrCurr and mb_qp_delta, in addition to other values corresponding to NUT, MBAFF_FLAG, and chroma_format_idc.

The various fields in the global register 614 may be updated using an INSERT instruction. An exemplary format for the INSERT instruction may be as follows:

INSERT DST, #Imm, SRC1

In the above INSERT instruction, one embodiment for #Imm comprises a 10-bit number, where the first 5-bit width of the data and the upper 5-bits specify the position where the data is to be inserted. Input parameters include the following:

```
Mask = NOT(0xFFFFFFFF<<#Imm[4:0])
Data = SRC1 & Mask
SDATA = Data<<#Imm[9:5]
SMask = Mask<<#Imm[9:5]
```

The output, DST, can be represented as follows:
DST=(DST & NOT(sMask)) | SDATA

Note that at least some of the fields (e.g., NUT (NAL_UNIT_TYPE), C (constrained_intra_pred_flag), MBAFF_FLAG, mbPerLine and mbAddrCurr values may also be written/initialized to the global register 614 using the INIT_CTX instruction.

The local register 612 comprises, in one embodiment, a 32-bit register having fields corresponding to b, mb_qp_delta, numDecodAbsLevelEq1, and numDecodAbsLevelGt1. These fields may be updated using the INSERT instruction. The local register 612 is also initialized such that b=0, mb_qp_delta=0, numDecodAbsLevelEq1=−1 and numDecodAbsLevelGt1=0. One instruction for providing this initialization can be implemented using the following format:

CWRITE SRC1, where SRC1[15:0]=mbAddrCurr. CWRITE SRC1 updates the mbAddrCurr field in the global register 614. Additional functionality provided through the CWRITE instruction is described below after a brief discussion of the neighboring element structures and their use in decoding.

In CABAC decoding, syntax values are predicted and/or modeled from their neighboring macroblocks (e.g., left, top). Various methods are described below that provide how certain embodiments of the VLD unit 530a determine the left and top neighboring macroblocks and how such embodiments determine whether these macroblocks are actually available. The mbPerLine parameter is used in the symbol decoding stage. As explained above, the decoding process uses neighboring values (e.g., from the macroblock or block to the above and to the left). In one embodiment, the BARD module 624 computes the following equations below, using the current macroblock number and the number of macroblocks on a line (mbPerLine) to calculate the top macroblock address and whether the left and above macroblocks are available.

For instance, to determine whether an adjacent macroblock (e.g., left neighbor) is present (i.e., valid), an operation (e.g., mbCurrAddr % mbPerLine) may be performed to check whether the result is zero. In one embodiment, the following computations may be performed:

$$a = (mbCurrAddr \% mbPerLine)$$

$$a = mbCurrAddr - \left\lfloor \frac{mbCurrAddr}{mbPerLine} \right\rfloor \times mbPerLine$$

Note that mbCurrAddr refers to the current macroblock location corresponding to the binary symbols to be decoded, and mbPerLine refers to the amount of macroblocks per a given row. The above computation is implemented using one divide, one multiply, and one subtract.

As a further illustration of the decoding mechanisms implemented by the BARD module 624, reference is made to FIG. 6E, which shows a picture that is to be decoded (16×8 macroblocks, and hence mbPerLine=16). If thirty-five (35) macroblocks are decoded (mbCurrent is labeled 35, the thirty-sixth macroblock, which has not yet been fully decoded), this requires data from the previously decoded top macroblock (labeled 19) and the left macroblock (labeled 34). The top macroblock information can be obtained from the mbNeighCtx[i], where i=mbCurrent % mbPerLine. Thus, for this example, i=35% 16, which equals 3. After the current macroblock has been decoded, the CWRITE instruction can be used to update the mbNeighCtxLeft 605 and mbNeighCtx [i] 601 in the array.

As another example, consider the following:

$$mbCurrAddr \in [0: \max MB-1],$$

with maxMB being 8192 and mbPerLine=120. In one embodiment, the divide can be performed with a multiply with (1/mbPerLine) being looked up in a table (e.g., a 120× 11-bit table) stored in on-chip memory. If the mbCurrentAddr is say, 13-bits, a 13×11-bit multiplier may be used. In one embodiment, the result of this multiply operation is rounded, the upper 13-bits are stored, and 13×7-bit multiply is performed, whereby the lower 13-bits are stored. Finally, a 13-bit subtract operation is performed to determine "a." The entire sequence of operations may take two (2) cycles, and the result may be stored to be utilized in other operations, and computed once when the mbCurrAddr value changes.

In some embodiments, the modulo computation is not performed, but instead, shader logic in the execution unit (e.g., EU 420a, 420b, etc.) is used to supply the first mbAddrCurr value aligned to lie in the first line of the slice. For example, such shader logic may perform the following calculation: mbAddrCurr=absoluteMbAddrCurr−n*mbPerLine. That is, because there are some very complex neighborhood structures for some H264 flexible macroblock ordering (FMO) modes, to cope with these modes, the left/top availability can be computed in an additional shader of the decoding system 200 and loaded to one or more registers serving the VLD unit 530a. By "off-loading" the VLD unit 530a, complexity of the hardware is reduced while enabling all H264 modes to be supported for symbol decoding.

The CWRITE instruction copies appropriate fields from mbNeighCtxCurrent 603 to mbNeighCtxTop[ ] 601 and mbNeighCtxLeft[ ] (e.g., the left macroblock in the array 564). The particular mbNeighCtxTop[ ] 601 and mbNeighCtxLeft[ ] data written to depends on whether the mBaffFrameFlag (MBAFF) is set and whether the current and previous macroblocks are field or frame coded. When (mbAddrCurr % mbPerLine==0) then mbNeighCtxLeft 605 is marked as being unavailable (e.g., it is initialized to zero). The contents of the mbNeighCtx memory 564, local register 612, and global register 614 may be "moved" using CWRITE instructions. For instance, the CWRITE instructions move the relevant content of mbNeighCtx memory 564 to the left and top block of the $i^{th}$ macroblock (e.g., mbNeighCtx[i] or current macroblock), and also clears the mbNeighCtx register 603. That is, as explained above, associated with the mbNeighCtx memory 564 is two pointers: left point 607*b* and top pointer 607*c*. After a CWRITE instruction, the top index is incremented by one and the content of the current macroblock is moved to the top position and also to the left position in the array. The aforementioned organization may reduce the number of read/write ports on this memory array to one read/write.

The contents of the mbNeighCtx memory 564, local register 612, and global register 614 may be updated using INSERT instructions, as described above. For instance, the current macroblock may be written using an INSERT instruction (e.g., INSERT $mbNeighCtxCurrent_1, #Imm10, SRC1). This latter operation does not affect the left 607*b* and top 607*c* pointers (i.e., only writes to the current position).

The INSERT instruction and updates from the BARD module 624 are written to the mbNeighCtxCurrent array element 601 of the mbNeighCtx memory 564. The left pointer 607*b* points to an element of memory 564 which is identical (i.e., a copy) of the memory of an adjacent (adjacent to mbNeighCtx 601) array element (i.e., mbNeighCtx[i−1]).

In view of the above description regarding obtaining a context and model information, the following section describes the BARD module 624 and arithmetic decoding based on the context and model information. The BARD module 624 operates under the BARD instruction, an exemplary format of which is provided below as follows:

BARD DST, SRC2, SRC1, which provides a binary arithmetic decoding operation wherein each bin decoding iteration results in a single bit output. The input parameters are as follows:

---
SRC1 = binIdx/ctxIdx, which is an output of the GCTX module 622; and
SRC2 = bypassFlag, which is an output of the BIND module 620.
---

When forwarding registers are used, one exemplary format may comprise BARD.F1.F2, where F1 and F2 indicate forwarding registers. If one or both of the corresponding forwarding flags are missing, this indicates which forwarded register is not utilized. Note that the BARD module 624 also receives the RST_Signal, as mentioned above. In particular, the BARD module 624 holds the RST_Signal until the first call to the BARD instruction after receiving the signal. Afterwards, the signal is cleared.

In operation, the BARD module 624 receives the context index (ctxIdx) value and a pointer to the current bit parsing position of the encoded bit stream (binIdx) from the GCTX module 622. The BARD module 624 uses the offset and range values from codIOffset register 608 and codIRange register 606 to keep track of the current interval (offset, offset+range) state of the decoding engine. The BARD module 624 uses the context index value to access the context table (CTX_TABLE), which in turn is used to access the current probability state pStateIdx and MPS values. The pStateIdx is used to read (e.g., from a table, which may be stored remotely or in on-chip memory) an LPS sub-range value, the next MPS value, and the next LPS probability value.

Based on the state of the MPS value, and the next range and probability information, the BARD module 624 calculates the MPS value of the current binary symbol. The BARD module 624 outputs a binary symbol (bit or bin value, e.g., $b_0$, $b_1, \ldots b_n$) to the binstring register 616. Then the process is repeated for the same or different context for the next bin, as shown by the feedback connection 658 from the binstring register 616 to the GCTX module 622. The BARD module 624 also provides updates to the offset and range values, as well as the probability state for the next bin based on the selection of the MPS value. In addition, the BARD module 624 writes the current MPS and probability state to the context table for use in future contexts.

Note that with regard to the use of forwarding registers F1 and F2, the instructions may or may not have latency if forwarding is signaled. For instance, in forwarding from the BIND module 620 to the GCTX module 622, there is no latency, and the GCTX instruction may be issued in the next cycle. In forwarding from the GCTX module 622 to the BARD module 624, four cycles can be consumed. If the GCTX instruction is issued in cycle j, then the BARD instruction may be issued in cycle (j+5). The absence of useful instructions causes the latency slots to be filled with up to 4 NOPs. In forwarding from the BIND module 620 to the BARD module 624, there is no latency. In forwarding from the BARD module 624 to the GCTX module 622, if the BARD instruction is issued in cycle j, then the GCTX instruction may be issued in cycle (j+5). In forwarding from the BARD module 624 to the BIND module 620, there is no latency if a second binstring is kept and there is switching between them. By keeping the second binstring, it is possible to issue a BARD to BARD instruction for bypass cases without suffering latency.

CAVLC Decoding

Having described the VLD unit 530 configured for CABAC decoding (VLD unit 530*a*), attention is now directed to the CAVLC embodiment of the decoding system 200, also referred to herein as VLD unit 530*b*, as shown in FIG. 7A. Before proceeding with the description of the CAVLC architecture, a brief summary of an H.264 CAVLC process in the context of the VLD unit 530*b* is described.

As is known, the CAVLC process encodes a level (e.g., magnitude) of a signal pertaining to a macroblock or portion thereof and how often (e.g., how many cycles) that level is repeated (e.g., the run), avoiding the need to encode every bit. Such information is received at and parsed from the bitstream buffer 562*b*, where the buffer is replenished as the information is consumed by a decoding engine of the decoding VLD unit 530*b*. The VLD unit 530*b* inverses the encoding process by extracting the macroblock information comprising the level and run coefficients from the received bitstream and reconstructing the signal. Thus, the VLD unit 530*b* receives the macroblock information from the bitstream buffer 562*b*, and parses out the stream to obtain level and run coefficient values for temporary storage in level and run arrays, respectively. These level and run arrays are read out, for instance, as 4×4 blocks of pixels corresponding to a block in a macroblock, and then the level and run arrays are cleared for the next block. The entire macroblock can be constructed in software based on the 4×4 building blocks according to the H.264 standard.

Now that the general operations involved in decoding macroblock information have been provided, the following description sets forth an explanation of the various components of the VLD unit 530b in the context of the CAVLC decoding process, with the understanding that variations consistent with accepted practices of the standard are contemplated. It should be appreciated by one having ordinary skill in the art in the context of this disclosure that many of the terms used below (for example, as labels for various parameters) can be found in the H.264 specification, and hence explanation of the same is omitted for brevity except where helpful to the understanding of the various processes and/or components described below.

Figure 7B:
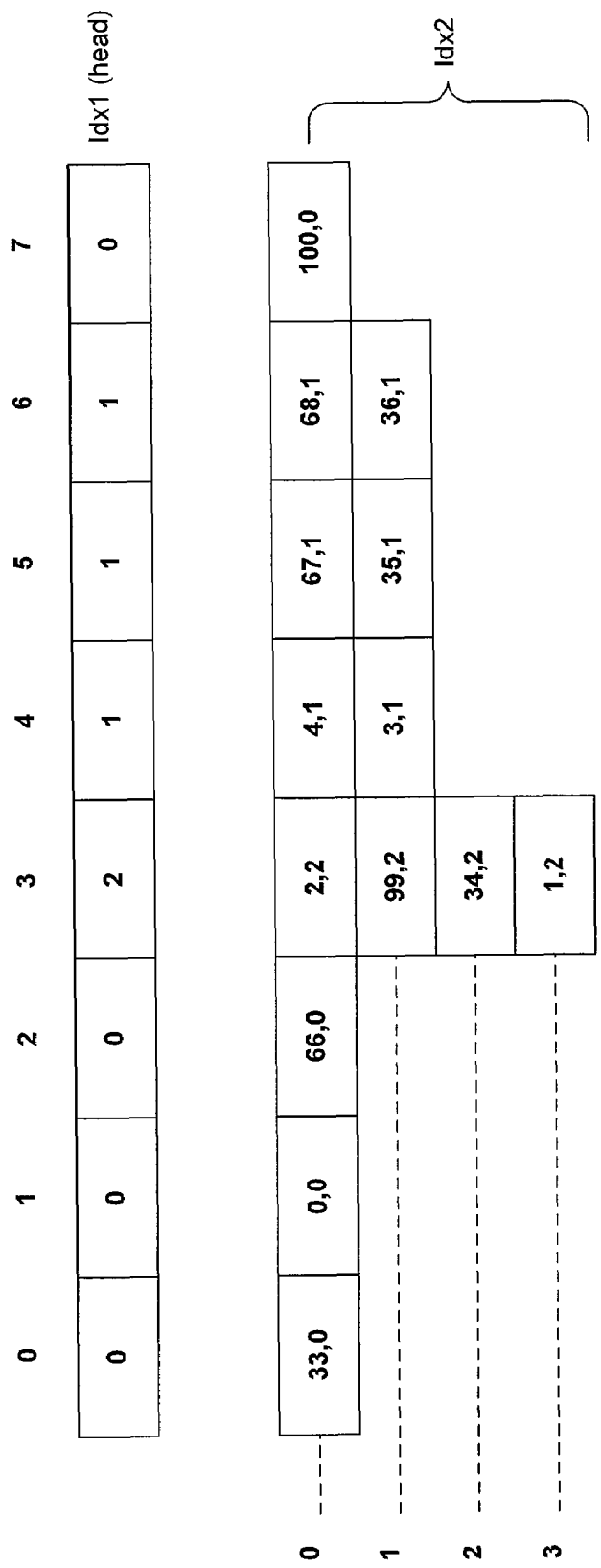
FIG. 7B is a block diagram of an embodiment of a table structure used by the decoding system shown in FIG. 7A.

FIG. 7A is a block diagram that illustrates an embodiment of the VLD unit 530b. A single VLD unit 530b is shown, and hence the VLD unit 530b is configured to decode a single bitstream in the illustrated embodiment. Similar principles apply to decoding systems 200 with additional VLD units used to simultaneously decode multiple (e.g., two) streams. Briefly, FIG. 7A illustrates select components of the VLD unit 530b and FIG. 7B illustrates a table structure for CAVLC decoding. It should be appreciated that although the below description is set forth in the context of macroblock decoding, the principles set forth herein may also apply to variations in block decoding.

The VLD unit 530b provides for parsing of a bitstream, initialization of the decoding hardware and register/memory structures, and level-run decoding. Each of the aforementioned functionality for the H.264 CAVLC decoding process is described further below. As for bitstream buffer operations, the SREG-stream buffer/DMA engine 562 is shared between the CABAC and CAVLC operations, and hence with the exception of the below-mentioned differences in use of operation between CABAC and CAVLC modes, further discussion of the same is omitted here for brevity. The same context memory 564 is used for both CABAC and CAVLC decoding embodiments, but the fields (e.g., structures) are different, as explained further below. Hence, where the context memory 564 for CAVLC operations is similar to that explained above for the CABAC process, discussion of the same is omitted for brevity. Additionally, the global register 614 and local register 612 are also re-used, and hence discussion of the same is omitted for brevity.

Referring to FIG. 7A, the VLD unit 530b comprises several modules of hardware, including a coefficient token module (coeff_token) 710, a level code module (CAVLC_LevelCode) 712, a level module (CAVLC_Level) 714, a level0 module (CAVLC_L0) 716, a zero level module (CAVLC_ZL) 718, a run module (CAVLC_Run) 720, a level Array (LevelArray) 722, and a run array (RunArray) 724. Also included in the decoding system is the SREG-stream buffer/DMA engine 562, global register 614, local register 612, and mbNeighCtx memory 564, as previously described.

The VLD unit 530b, at its interface to the rest of the execution unit 420a, includes one or more destination buses and corresponding register(s) (e.g., DST registers) and source buses and corresponding registers (SRC1, SRC2, etc.), similar to that described above for the CABAC embodiment.

In general, based on the slice type, the driver software 128 (FIG. 1) prepares and loads a CAVLC shader to the execution unit 420a. The CAVLC shader uses standard instruction sets plus additional instruction sets, labeled for purposes of this disclosure in a manner that mirrors the module that executes the instruction, including coeff_token, CAVLC_LevelCode, CAVLC_Level, CAVLC_L0, CAVLC_ZL, and CAVLC_Run instructions to decode a bitstream. Additional instructions include READ_LRUN and CLR_LRUN pertaining to read and clear operations on the LevelArray 722, and RunArray 724. In one embodiment, the first instructions executed by the CAVLC shader include an INIT_CAVLC and INIT_ADE before other instructions are issued. These two latter instructions, explained further below, initialize the VLD unit 530b to decode a CAVLC bitstream and load the bitstream into a FIFO buffer from which point stream decoding is managed automatically. Thus, the VLD unit 530b provides for parsing of a bitstream, initialization of the decoding hardware and register/memory structures, and level-run decoding. Each of the aforementioned functionality for the H.264 CAVLC decoding process is described further below.

As to instructions pertaining to the bitstream, in addition to the READ and INIT_BSTR instructions previously described for the CABAC process and shared in the CAVLC process, there are two other instructions pertaining to bitstream access more relevant to the CAVLC process, namely the INPSTR (corresponding to the INPSTR module 570) and INPTRB instructions (the former loaded to the VLD logic 550 in FIG. 5C). The INPSTR and INPTRB instructions are not necessarily limited to CAVLC operations (e.g., such instructions may be used in other processes, such as CABAC, VC-1, and MPEG). The INPSTR and INPTRB are used to detect whether special patterns (e.g., data start or end patterns) are present in the slice, macroblock, etc., enabling a read of the bitstream without progressing the bitstream. The sequence of instructions, in one embodiment, comprises the implementation of the INPSTR, INPTRB, and then the READ instruction. The INPSTR instruction comprises the following exemplary format:

INPSTR DST, which in one embodiment inspects the bitstream and returns the most significant 16-bits of sREG 562a in the lower 16-bits of a destination (DST) register. The upper 16-bits of a destination register contains the value of sREGbitptr. The data is not removed from the sREG 562a as a result of this operation. This instruction can be implemented according to the following exemplary pseudocode:

```
MODULE INPSTR (DST)
OUTPUT [31:0] DST
DST = {ZE (sREGbitptr), sREG [msb: msb-15]};
ENDMODULE
```

Another instruction pertaining to the bitstream is the INPTRB instruction, which inspects the raw byte sequence payload (RBSP) trailing bits (e.g., the byte-aligned bitstream). The INPTRB instruction provides for the reading of the bitstream buffer 562b. One exemplary format can be expressed as follows:

INPTRB DST.

In the INPTRB operation, no bits are removed from the SREG 562a. If the most significant bits of the sREG 562a contains, for instance, 100, then it consists of the RBSP stop bit, and the remaining bits in the byte are alignment zero bits. This instruction can be implemented according to the following exemplary pseudocode:

```
MODULE INPTRB(DST)
OUTPUT DST;
REG [7:0] P;
P = sREG [msb: msb-7];
Sp = sREGbitptr;
T [7:0] = (P >> sp) << sp;
DST [1] = (T = = 0x80)? 1: 0;
```

-continued

```
    DST[0] = ! (CVLC_BufferBytesRemaining > 0);
ENDMODULE
```

The READ instruction provides for the alignment of the data in the bitstream buffer 562b.

Now that the additional bitstream buffer operations of the VLD unit 530b have been described, attention is now directed to the initialization of CAVLC operations and, in particular, the initialization of memory and register structures and the decoding engine (e.g., CAVLC module 582). At the start of a slice, and before decoding a syntax element corresponding to a first macroblock, register structures, global register 614, local register 612, and the CAVLC module 582 are initialized. In one embodiment, this initialization is performed upon issuance by the driver software 128 using an INIT_CAVLC instruction. The INIT_CAVLC instruction may be implemented according to the following exemplary instruction format:

INIT_CAVLC SRC2, SRC1, where:

SRC2 comprises the number of bytes to be decoded in the slice data. This value is written to an internal CVLC_buffer-BytesRemaining register;

```
    SRC1 [15:0] = mbAddrCurr,
    SRC1 [23:16] = mbPerLine,
    SRC1 [24] = constrained_intra_predflag,
    SRC1 [27:25] = NAL_unit_type (NUT),
    SRC1 [29:28] = chroma_format_idc (one embodiment uses a
chroma_format_idc value of one (1) corresponding to a 4:2:0 format,
although other sampling mechanisms may be used in some embodiments),
and
    SRC1 [31:30] = Undefined.
```

With regard to the INIT_CAVLC instruction, the value in SRC1 is written to the corresponding fields in the global register 614. Further, the value in SRC2 is written to an internal register (e.g., CVLC_bufferByteRemaining) set-up by the INIT instructions. The CVLC_bufferByteRemaining register is used to recover from any corrupted bitstream, as explained above. For instance, at the start of decoding, the VLD unit 530b (e.g., the SREG-stream buffer/DMA engine 562) records information pertaining to the buffered bits in the bitstream for a given slice. As the bitstream is consumed, the VLD unit 530b counts and updates the CVLC_bufferByteRemaining value. If this value goes below zero, the below-zero value is an indication that the buffer or bitstream is corrupted, prompting the termination of processing and the return to application control or control by the driver software 128 to handle recovery.

The INIT_CAVLC instruction also initializes the various storage structures of the VLD unit 530b, including the mbNeighCtx memory 564 and registers mbNeighCtxLeft 605 and mbNeighCtxCurrent 603 in a manner similar to as previously described for the CABAC process. Given the contextual nature of CAVLC decoding, decoding of the current macroblock is based on information gleaned by the CAVLC_TOTC instructions from previously decoded macroblocks, namely the left macroblock stored in mbNeighCtxLeft 605 and pointed to by left pointer 607b and the top macroblock stored in the array element (referenced as "i") 601 and pointed to by top pointer 607c. The INIT_CAVLC instruction is used to initialize the top and left pointers 607c and 607b, as well as to update the global register 614.

To determine whether an adjacent macroblock (e.g., left neighbor) is present (i.e., valid), an operation (e.g., mbCurrAddr % mbPerLine) may be performed by the CAVLC_TOTC instruction, similar to the manner in which the same process is performed in the CABAC embodiment, and hence omitted here for brevity.

Similar to that described for the CABAC process, the contents of the mbNeighCtx memory 564 may be "moved" using CWRITE instructions, and the contents of the mbNeighCtx memory 564, local register 612, and global register 614 may be updated using INSERT instructions (which may also be used for writes to the mbNeighCtxCurrent 603). The structure of the data held in mbNeighCtx memory 564 can be described as follows:

```
    mbNeighCtxCurrent[01:00] : 2'b : mbType
    mbNeighCtxCurrent[65:02] : 4'b : TC[16]
    mbNeighCtxCurrent[81:66] : 4'b : TCC[cb][4]
    mbNeighCtxCurrent[97:82] : 4'b : TCC[cr][4]
```

When the CWRITE instruction is performed, it updates the mbNeighCtx[ ] neighborhood data and initializes mbNeighCtxCurrent 603 afterwards.

Having described the context memory structures utilized by the VLD unit 530b and initialization in general, the following describes how the VLD unit 530b, and in particular, the CAVLC_TOTC instruction, uses the neighboring context information to calculate the TotalCoeff (TC), the latter which is used to determine which CAVLC tables should be used to decode the symbol. Generally, CAVLC decoding makes use of variable length decoding tables described under the H.264 specification (herein, CAVLC tables) where a CAVLC table is selected to decode each symbol based on the context of previously decoded symbols. That is, for each symbol there may be a different CAVLC table. A basic table structure is described below and shown in FIG. 7B as a variable size two dimensional (2D) array. That is, there is provided an array of "Table" (each of these tables may be for a particular symbol), and then each of these symbols is Huffman coded. This Huffman code is stored as a table of the following structure:

```
    struct Table{
        unsigned head;
        struct table{
            unsigned val;
            unsigned shv;
        }table[ ];
    }Table[ ];
```

Below, a scheme for matching (MatchVLC function) based on unique prefix coding is described. In general, it is observed that CAVLC tables are comprised of a variable length portion and a fixed length portion. Using this observation, matching can be simplified by performing a number of fixed-size indexed lookups. In a MatchVLC function, a READ operation is performed that does not remove bits from the sREG 562a. Thus, the READ operation is different than the READ instruction expressed above for the bitstream buffer 562b, the latter which progresses the bitstream. In the MatchVLC function illustrated below, a number of bits (fixL) are copied from the bitstream buffer 562b, which are then looked up in the specified table. Each entry in the specified table consists of a dublet (e.g., value and size (in-bits)). The size is used to progress the bitstream.

```
FUNCTION MatchVLC(Table, maxIdx)
INPUT Table;
INPUT maxIdx;
    Idx1 = CLZ(sREG);        //count number of leading zeros
    Idx1 = (Idx1 > maxIdx)? maxIdx : Idx1;
    fixL = Table[Idx1].head;
    SHL(sREG, Idx1+#1);      //shift buffer Idx1+1 bit left
    Idx2 = (fixL)? 0 : READ(fixL);
    (val, shv) = Table[Idx1][Idx2];
    SHL(sREG, shv);
    return val;
ENDFUNCTON
```

FIG. 7B is a block diagram of an exemplary two-dimensional (2D) array of the table structure above, and is used hereinafter to describe the MatchVLC function in the context of CAVLC decoding. The example is taken from Table 9-5 in the H.264 standard for when nC==−1, which is as follows:

| Coeff_token | TrailingOnes | TotalCoeff | Head | Value | Shift |
|---|---|---|---|---|---|
| 1 | 1 | 1 | 0 | 33 | 0 |
| 01 | 0 | 0 | 0 | 0 | 0 |
| 001 | 2 | 2 | 0 | 66 | 0 |
| 000100 | 0 | 2 | 2 | 2 | 2 |
| 000101 | 3 | 3 | | 99 | 2 |
| 000110 | 1 | 2 | | 34 | 2 |
| 000111 | 0 | 1 | | 1 | 2 |
| 000010 | 0 | 4 | 1 | 4 | 1 |
| 000011 | 0 | 3 | | 3 | 1 |
| 0000010 | 2 | 3 | 1 | 67 | 1 |
| 0000011 | 1 | 3 | | 35 | 1 |
| 00000010 | 2 | 4 | 1 | 68 | 1 |
| 00000011 | 1 | 4 | | 36 | 1 |
| 0000000 | 3 | 4 | 0 | 100 | 0 |

In terms of pseudo code, the above table can be expressed as follows:

```
Table9-5[8] = {
0, {{33, 0}},
0, {{0, 0}},
0, {{66, 0}},
2, {{2, 2}, {99, 2}, {34, 2}, {1, 2}},
1, {{4, 1}, {3, 1}},
1, {{67, 1}, {35, 1}},
1, {{68, 1}, {36, 1}},
0, {{100, 0}}
};
```

Using such a table structure, the MatchVLC function described above can be used for implementing CAVLC decoding. Note from the MatchVLC function that a count leading zero is performed on the bitstream to provide access into the table for a given syntax element. Further, the MatchVLC function enables a parameterized count leading zero (CLZ) operation (e.g., using in some embodiments the CLZ module 576 in cooperation with the Read module 572) by which if the CLZ value is larger than a max Idx, then the maxIdx is returned (which handles the case for 0000000 as shown in the table in FIG. 7B). Another benefit of the MatchVLC function and table structure is that multiple instructions are unnecessary to handle these cases, which are handled by the following MatchVLC sections: Idx1=CLZ(sREG); //count number of leading zeros, and Idx1=(Idx1>maxIdx)? maxIdx: Idx1. The consumed bits are then removed using the following section of the MatchVLC function: SHL(sREG, Idx1+#1); //shift buffer Idx1+1 bit left. The header for the sub-array is read using the following MatchVLC sections: fixL=Table[Idx1].head, and Idx2=(!fixL)? 0: READ(fixL), which conveys the maximum number of bits to be speculatively read. The leading zero may be same, but the trailing bits may be variable in size. Hence, in one embodiment, CASEX-type case statements are implemented (using more "memory" but a simpler code structure).

The actual values from the table are read using (val, shv)= Table[Idx1][Idx2] and SHL(sREG, shv), which also reveals how many bits are actually used for this syntax element. These bits are removed the bitstream, and the value of the syntax element is returned in a destination register.

Having described a method for VLC matching and configuration of a table structure, attention is returned to FIG. 7A to describe the CAVLC decoding engine or process (e.g., CAVLC module 582). Once the bitstream is loaded and the decoding engine, memory structures, and registers are loaded, the coeff_token module 710 is enabled via the driver software 128 issuing a CAVLC_TOTC instruction, which in one embodiment has the following exemplary format:

CAVLC_TOTC DST, S1, where S1 and DST comprises an input register and an internal output register, respectively, having the exemplary formats provided below:

| SRC1 [3:0] = blkIdx |
|---|
| SRC1 [18:16] = blkCat |
| SRC1 [24] = iCbCr |

The remaining bits are undefined. The output format is as follows:

| DST [31:16] = TrailingOnes |
|---|
| DST [15:0] = TotalCoeff |

Thus, as shown, the coeff_token module 710 receives information corresponding to the mbCurrAddr, mbType, an indication as to whether a chroma channel is under process (e.g., iCbCr), and blkIdx (e.g., the block index, since the picture may be broken up into many blocks). For a given macroblock accessed from the bitstream buffer 562b, the blkIdx conveys whether an 8×8 pixel block or 4×4 pixel block is under process at a given location. Such information is provided by the driver software 128. The coeff_token module 710 comprises a look-up table. Based on the above-described inputs to the look-up table of the coeff_token module 710, the trailing ones (TrailingOnes) and total coefficients (TotalCoeff) are obtained. The trailing ones convey how many 1s are in a row, and the total coefficients convey how many run/level pair coefficients are in a chunk of data pulled from the bitstream. The TrailingOnes and a TotalCoeff are provided to the CAVLC_Level module 714 and CAVLC_ZL module 718, respectively. The TrailingOnes is also provided to CAVLC_L0 module 716, which corresponds to the first level (e.g., the direct current (DC) values) extracted from the bitstream buffer 562b.

The CAVLC_Level module 714 keeps a track of the suffix length of the symbol (e.g., the number of trailing ones), and combined with levelCode, calculates the level value (level [Idx]), the latter of which is stored in the level array 722 and run array 724. The CAVLC_Level module 714 operates under the CAVLC_LVL instruction, which has the following format:

CAVLC_LVL DST, S2, S1, where:

> S1 = Idx (16-bit),
> S2 = suffixLength (16-bit), and
> DST = suffixLength (16-bit).

The suffixLength conveys how large the code word is going to be. Input coming from the driver software 128 provides information that specifies what the suffixLength is to be. Additionally, it is noted that in one embodiment, DST and S2 may be chosen to be the same register since the suffixLength value is updated.

Note further that forwarding registers (e.g., holding data generated internally by a given module), such as F1 and F2, may also be used. Whether an instruction, and hence corresponding module, uses a forwarding register is indicated by forwarding flags in the given instruction. Symbols to represent the forwarding registers may include F1 (i.e., forwarded source 1 value is to be used, which in one embodiment may be indicated by bit 26 in the instruction) and F2 (i.e., forwarded source 2 value is to be used, which in one embodiment may be indicated by bit 27 in the instruction). When forwarding registers are used, the CAVLC_LVL instruction may take on the following exemplary format:

CAVLC_LVL.F1.F2 DST, SRC2, SR1, where if either F1 or F2 are set (e.g., at one (1)), then the specified forwarded source is taken as input. In the case of the CAVLC_Level module 714, forwarding register F1 corresponds to a level index (level[Idx]) generated by the CAVLC_Level module 714 that is incremented at an increment module and input to multiplexer 730. Also forwarding register F2 corresponds to the suffixLength that is generated by CAVLC_Level module 714 and input to multiplexer 728. Other inputs to multiplexer 730 and multiplexer 728 includes EU register inputs (represented in FIG. 7A as EU), as described below.

An additional input to CAVLC_Level module 714 is levelCode, as provided by the CAVLC_LevelCode module 712 and referred to above. The combined operations of the CAVLC_LevelCode module 712 and CAVLC_Level module 714 decode the level value (level is the value of the transform coefficient before scaling). The CAVLC_LevelCode module 712 is enabled through an instruction having the following exemplary format:

CAVLC_LC SRC1, where SRC1=suffixLength (16-bit). If forwarding register F1 is used, then the instruction is expressed as follows:

CAVLC_LVL.F1 SRC1, where if F1 is set, then forwarded SRC1 is taken as the input. That is, and as shown in FIG. 7A, if F1 is set (e.g., F1=1), the CAVLC_LevelCode module 712 takes the forwarded SRC1 value (e.g., suffixLength from CAVLC_Level module 714) as an input, otherwise input is taken from an EU register (e.g., if F1=0).

Returning to the CAVLC_Level module 714, the suffixLength input can either be forwarded by CAVLC_Level module 714 via multiplexer 728 or provided via an EU register through multiplexer 728. Additionally, the Idx input can likewise either be forwarded by CAVLC_Level module 714 via multiplexer 730 (and incremented by increment module, or in some embodiments, auto-incremented without the increment module), or via an EU register through multiplexer 730. Further, the CAVLC_Level module 714 also receives levelCode input directly from the CAVLC_LevelCode module 712. In addition to the output to forwarding registers, the CAVLC_Level module 714 also provides a level index (level[idx]) output to the level array 722.

As referenced above, the TrailingOnes output (e.g., the DC values) is provided to the CAVLC_L0 module 716. The CAVLC_L0 module 716 is enabled by the following instruction:

CAVLC_LVL0 SRC, where SRC =trailingOnes(coeff_token). The output of the CAVLC_L0 module 716 comprises a level index (Level [Idx]), which is provided to the level array 722. The coefficient values are coded as sign, magnitude. The CAVLC_L0 module 716 provides the sign value for the coefficient. The magnitude from the CAVC_Level module 714 is combined with the sign from CAVLC_L0 716 and written to the level array 722. The write location is specified using the level index (level[idx]). The coefficients, in one embodiment, are in a 4×4 matrix for a sub-block (blocks are 8×8), yet not in raster order. This array is later converted to a 4×4 matrix. In other words, the coefficient level and run as decoded are not in raster format. From the level-run data, 4×4 matrix can be reconstructed (but in the zig-zag scan order), and then re-ordered into raster order 4×4.

The TotalCoeff output from the coeff_token module 710 is provided to the CAVLC_ZL module 718. The CAVLC_ZL module 718 is enabled through the following instruction:

CAVLC_ZL DST, SRC1, where SRC1=maxNumCoeff(16-bit) and DST=ZerosLeft (16-bit). The maxNumCoeff is given in the H.264 standard, and is passed to as a source value in the instruction. In other words, the maxNumCoeff is set by the software. In some embodiments, the maxNumCoeff may be stored as a value in hardware. The transform coefficients are coded as (level, run) dublets, which refer to the number of coefficients (levels) which are coded as zero. The CAVLC_ZL module 718 provides two outputs, ZerosLeft and Reset (reset=0), which are provided to multiplexers 740 and 742, respectively. The multiplexer 740 also receives a forwarding register, F2, from CAVLC_Run module 720. The register 742 receives an incremented (via increment module or otherwise in some embodiments) forwarding register, F1, from the CAVLC_Run module 720.

The CAVLC_Run module 720 receives the ZerosLeft and Idx inputs from the respective multiplexers 740 and 742, and provides a run index (Run[Idx]) output to the run array 724. As mentioned above, coefficients are coded as a (level, run) dublet because run-length coding is used as further compression. For example, assuming possession of the following set of values 10 12 12 15 19 1 1 1 0 0 0 0 0 0 1 0, then this may be coded as (10,0)(12,1)(15,0)(19,0)(1,2)(0,5)(1,0)(0,0). This codeword is often shorter. The index is the corresponding index to the level index. The CAVLC_Run module 720 is enabled through the following instruction:

CAVLC_RUN DST, S2, S1, where DST and S2 may be chosen to be the same register since the ZerosLeft value is updated. Thus, exemplary unsigned values for CVLC_Run are found as follows:

```
            S1 = Idx(16-bit),
            S2 = ZerosLeft(16-bit),
            DST = Zerosleft(16-bit)
```

As noted from FIG. 7A, forwarding registers may be used, in which case the CAVLC_RUN instruction may take on the following format:

CAVLC.F1.F2 DST, SRC2, SRC1, where if either F1 or F2 are set, then the appropriate forwarded source is taken as input.

With regard to the two register arrays, level array 722 corresponding to the level and run array 724 corresponding to the run, in one embodiment, each of these arrays consists of sixteen (16) elements. For the level array 722, the size of each element comprises a 16-bit signed value, and for the run array 724, the values are 4-bit unsigned. The run and level values are read from the run array 724 and level array 722, respectively, using the following instruction:

READ_LRUNDST, where DST comprises, in one embodiment, four 128-bit consecutive temporary registers (e.g., EU temporary or common registers). This operation reads the level 722 and run 724 registers in the VLD unit 530*b* and stores them in a destination register, DST. When the run is read and stored in the temporary registers, the run values are converted to 16-bit unsigned values. For instance, the first two registers hold the sixteen 16-bit LEVEL (i.e., the array stores the first sixteen coefficients) values, and the third and fourth registers hold the sixteen 16-bit RUN values. If there are more than sixteen coefficients, they are decoded to memory. In one embodiment, the values are written in the following order: in the first register, the least significant 16-bits contain the value LEVEL [0], bits 16-31 contain the value LEVEL[1], etc., until bits 112-127 contain the value LEVEL[7]. Then for the second register pair, the least significant 16-bits contain LEVEL[8], etc. The same methodology applies for the RUN values.

Another instruction is used to clear the run array 724 and level array 724 registers according to the following exemplary instruction format:

CLR_LRUN.

The above-described software (shader programming) and hardware operations (e.g., modules) of the VLD unit 530*b*, and in particular, the CAVLC module 582 can be described using the following pseudocode:

```
Residual_block_cavlc( coeff Level, maxNumCoeff ) {
    CLR_LEVEL_RUN
        coeff_token
        if( TotalCoeff( coeff_token ) > 0 ) {
            if( TotalCoeff( coeff_token ) > 10 &&
                TrailingOnes( coeff_token ) < 3 )
                    suffixLength = 1
            Else
                    suffixLength = 0
    CAVLC_leve0( );
            for( I = TrailingOnes(coeff_taken); I <
                TotalCoeff( coeff_token ); i++ ){
            CAVLC_levelCode(levelCode,suffixLength);
            CAVLC_level(suffixLength, i,levelCode)
        }
        CAVLC_ZerosLeft(ZerosLeft, maxNumCoeff)
            for( i = 0; i < TotalCoeff( coeff_token ) - 1 ;
                 i++ ) {
            CAVLC_run(i, ZerosLeft)
```

```
        READ_LEVEL_RUN(level, run)
        run[ TotalCoeff( coeff_token ) - 1 ] = zerosLeft
        coeffNum = -1
        for( i = TotalCoeff( coeff_token ) - 1 ; i >= 0;
        i-- ) {
            coeffNum += run[ i ] + 1
            coeffLevel[ coeffNum ] = level[ i ]
        }
    }
}
```

MPEG Decoding

Having described the decoding system 200 configured for CABAC decoding (VLD unit 530*a* via CABAC module 580) and CAVLC decoding (VLD unit 530*b* via CAVLC module 582), attention is now directed to the MPEG embodiment of the decoding system 200, referred to herein as VLD unit 530*c*. The VLD unit 530*c* operates based on operations performed by the MPEG2 module 578 shown in FIG. 5C. Features that are shared with the CABAC and CAVLC embodiments, including the bitstream buffer arrangement and corresponding instructions, are omitted herein for brevity except as otherwise noted below.

An INIT instruction places the VLD unit 530 into the MPEG mode, and a mixture of READ, INPSTR, INPTRB (explained above) and VLC_MPEG2 instructions are used to decode a MPEG-2 bitstream. Which method to use is determined by the shader program. The MPEG2 bitstream has a fully deterministic grammar and the shader code implements the method for deciphering this grammar.

In one embodiment, for MPEG-2 processing, the tables are implemented as well as the Huffman decoding in the MatchVLC_X functions described below. Hence, two instructions are loaded to the MPEG2 module 578: INIT_MPEG2 and VLC_MPEG2. The INIT_MPEG2 instruction loads the bitstream and puts the VLD Unit 530 into the MPEG2 mode. In this mode, the global register 614 holds the value if the first coefficient is DC. In MPEG-2, there are one or more strings which are identical but interpreted differently depending on whether it is DC or AC. Rather than create another instruction, a bit loaded into the VLD_globalRegister.InitDC register is used. Note that this register corresponds to the global register 614 (e.g., maps to the global register 614 (e.g., globalregister[0])) used in CABAC and CAVLC, but is interpreted differently (and hence designated differently) because of the MPEG2 mode. Thus at the start of a macroblock, this value (the bit in VLD_globalRegister.InitDC register) is initialized to 1. When the MatchVLC_3 function is used, a determination is made as to whether the bit in VLD_globalRegister.InitDC register is 1 or 0. If one, the bit is changed to 0 for subsequent discrete cosine transform (DCT) symbol decoding for the given macroblock. This value is set by the shader and reset internally. In physical terms, the VLD_globalRegister.InitDC bit is a flag value which conveys whether the DCT symbol to be decoded is the first of the DCT symbols for the given macroblock.

The MPEG2 module 578 decodes using a very specific grammar with the symbols coded using a limited number of Huffman tables. The parsing for the grammar is performed in the shader with the specific symbol values obtained using the VLC_MPEG2 instruction with #Imm16 value used for the particular Huffman table which should be used to decode a particular symbol.

Before describing the various components of the VLD unit 530c, a brief discussion of the hardware and software structures for implementing the various tables common to the MPEG-2 standard are described below. In the MPEG-2 Standard (ISO-IEC 13818-2 (1995)), the coding used is defined in Tables B-1 to B-15, which are known tables provided for in the MPEG-2 standard. In the various embodiments described herein for the VLD unit 530c, one or more of the B-1 to B-15 tables are implemented in specialized hardware, such as synthesized to gates. Depending on the implementation (e.g., HDTV, HDDVD, etc.) or the required hardware arrangement, some tables may not be implemented in hardware, but rather, may be implemented using other instructions (e.g., EXP-GOL_UD, as explained below, or via the READ instruction). For instance, although the gate count for the tables B-2, B-3 and B-11 are small, their addition may require additional multiplexer stages, which has implications for speed and latency. As another example, in some embodiments, tables B-5-B-8 are not supported in hardware (e.g., because there is no requirement to support the scalabilty profiles). However, some embodiments may provide for such support through the use of various instructions (e.g., INPSTR, EXP_GOL_UD, and READ instructions) with minimum impact on performance.

With continued reference to known MPEG tables, table B-1 (Macroblock_address_increment), table B-10 (motion_code) and table B-9 (coded_block_pattern) have similar constructions. Due in part to this similarity, these three tables can be implemented using the MatchVLC functions implemented by the MPEG2 module 578 and described below. For tables B-9 and B-10, an exemplary table structure can be expressed as follows:

```
struct Table{
    unsigned head; //number of bits for table address
    struct table{
        unsigned val:6; //can be 5-bit for B-10
        unsigned shv:2; //number of actual bits
    }table[ ];
}Table[ ];
```

For table B-1, an exemplary table structure can be expressed as follows:

```
struct Table{
    unsigned head; //number of bits for table address
    struct table{
        unsigned val:5;
        unsigned shv:3; //number of actual bits
    }table[ ];
}Table[ ];
```

In the following functions, only the SHL operation removes data from the sREG 562a. Unlike the shader READ instruction, the READ functions used in the MatchVLC function returns bits from the sREG 562a without removing any bits from the buffer 562b. The below-described MatchVLC functions implement the tables used in MPEG2 to provide for Huffman decoding.

```
FUNCTION MatchVLC_1{
    T = READ(2);       //read 2bits
    SHL(2);
    CASE (T){
    00 : OUTPUT(1);
    01 : OUTPUT(2);
    10 : {
        Q = READ(1);
        SHL(1);
        CASE (Q){
        0 : OUTPUT(0);
        1 : OUTPUT(3);
        }
    }
    11 : {
        Idx = CLO(sREG); //Count leading ones
        Idx = min(Idx,7);
        shv = (Idx != 7) Idx+1 : Idx;
        SHL(shv);
        OUTPUT(4+Idx);
    }
}
FUNCTION MatchVLC_2{
    T = READ(2);       //read 2bits
    SHL(2);
    CASE (T){
    00 : OUTPUT(0);
    01 : OUTPUT(1);
    10 : OUTPUT(2);
    11 : {
        Idx = CLO(sREG); //Count leading ones
        Idx = min(Idx,8);
        shv = (Idx != 8) Idx+1 : Idx;
        SHL(shv);
        OUTPUT(3+Idx);
    }
}
FUNCTION MatchVLC_3{
    INIT_MB DC = TRUE;
    T = CLZ(sREG);
    SHL(T+1);
    CASE (T){
    0 : IF (DC){
        DC = FALSE;
        Q = READ(1);
        SHL(1);
        OUTPUT({0,SGN(Q)*1});}
        ELSE{
        Q = READ(1);
        IF (!Q) {OUTPUT({63,0}); shv=1} // EOB
        ELSE {R=READ(1); OUTPUT({0,SGN(R)*1});
        shv=2}
        SHL(shv);
    }
    1 :{
        Q = READ(3);
        CASE (Q){
        1XX : OUTPUT({1, SGN(Q[1])*1}); shv = 2;
        01X : OUTPUT({2, SGN(Q[0])*1}); shv = 3;
        00X : OUTPUT({0, SGN(Q[0])*2}); shv = 3;
        }
        SHL(shv);
    }
    2 : {
        Q = READ(2); SHL(2);
        CASE (Q){
        00 : {
            R = READ(4);
            CASE (R){
            000X : OUTPUT({16, SGN(R[0])*1});
            001X : OUTPUT({5, SGN(R[0])*2});
            010X : OUTPUT({0, SGN(R[0])*7});
            011X : OUTPUT({2, SGN(R[0])*3});
            100X : OUTPUT({1, SGN(R[0])*4});
            101X : OUTPUT({15, SGN(R[0])*1});
            110X : OUTPUT({14, SGN(R[0])*1});
            111X : OUTPUT({4, SGN(R[0])*2});
            }
            Shv = 4;
        }
        01X : SGN = READ(1); OUTPUT({0, SGN*3}); shv = 1;
```

-continued

```
            10X : SGN = READ(1); OUTPUT({4, SGN*1}); shv = 1;
            11X : SGN = READ(1); OUTPUT({3, SGN*1}); shv = 1;
         }
         SHL(shv);
      }
      3 : {
         Q = READ(3);
         CASE (Q){
         00X : OUTPUT({7, SGN(Q[0])*1});
         01X : OUTPUT({6, SGN(Q[0])*1});
         10X : OUTPUT({1, SGN(Q[0])*2});
         11X : OUTPUT({5, SGN(Q[0])*1});
         }
         SHL(3);
      }
      4 : {
         Q = READ(3);
         CASE (Q){
         00X : OUTPUT({2, SGN(Q[0])*2});
         01X : OUTPUT({9, SGN(Q[0])*1});
         10X : OUTPUT({0, SGN(Q[0])*4});
         11X : OUTPUT({8, SGN(Q[0])*1});
         }
         SHL(3);
      }
      5 : Q = READ(19); OUTPUT({Q[18:13], Q[12:0]});
      6 : {
         Q = READ(4);
         CASE (Q){
         000X : OUTPUT({16, SGN(Q[0])*1});
         001X : OUTPUT({5, SGN(Q[0])*2});
         010X : OUTPUT({0, SGN(Q[0])*7});
         011X : OUTPUT({2, SGN(Q[0])*3});
         100X : OUTPUT({1, SGN(Q[0])*4});
         101X : OUTPUT({15, SGN(Q[0])*1});
         110X : OUTPUT({14, SGN(Q[0])*1});
         111X : OUTPUT({4, SGN(Q[0])*2});
         }
         SHL(4);
      }
      7, 8, 9, 10, 11: JVLC(TableC[T]);
   }
}
FUNCTION MatchVLC_4{
   T = CLZ(sREG);
   SHL(T+1);
   CASE (T){
      0 : {
         Q = CLO(sREG);
         R = min(Q,7);
         shv = (R != 7) R+1 : R;
         SHL(shv);
         CASE (R){
         0 : S = READ(1); OUTPUT({0, SGN(S)*1}); shv=1;
         1 : S = READ(1); OUTPUT({0, SGN(S)*2}); shv=1;
         2 :{
            R = READ(2); SHL(2);
            CASE (R){
            0X : OUTPUT({0, SGN(R[0])*4});
            1X : OUTPUT({0, SGN(R[0])*5});
            }
         }
         3 :{
            R = READ(3); SHL(3);
            CASE (R){
            00X : OUTPUT({9, SGN(R[0])*1});
            01X : OUTPUT({1, SGN(R[0])*3});
            10X : OUTPUT({10, SGN(R[0])*1});
            11X : OUTPUT({0, SGN(R[0])*8});
            }
         }
         4 :{
            R = READ(3);
            CASE (R){
            0XX : OUTPUT({0, SGN(R[0])*9}); shv=2;
            10X : OUTPUT({0, SGN(R[0])*12}); shv = 3;
            11X : OUTPUT({0, SGN(R[0])*13}); shv = 3;
            }
            SHL(shv);
         }
         5 ::{
            R = READ(2); SHL(2);
            CASE (R){
            0X : OUTPUT({2, SGN(R[0])*3});
            1X : OUTPUT({4, SGN(R[0])*2});
            }
         }
         6 : S = READ(1); OUTPUT({0, SGN(S)*14}); shv=1;
         7 : S = READ(1); OUTPUT({0, SGN(S)*15}); shv=1;
         }
         SHL(shv);
      }
      1 : {
         Q = READ(2); SHL(2);
         CASE (Q){
         0X : OUTPUT({1, SGN(Q[0])*1});
         10 : OUTPUT({63,0}); //<EOB>
         11 : R = READ(1); SHL(1); OUTPUT(0,SGN(R)*3);
         }
      }
      2 : {
         Q = READ(2); SHL(2);
         CASE (Q){
         00 :{
            R = READ(4); shv = 4;
            CASE (R){
            000X : OUTPUT({1, SGN(R[0])*5});
            001X : OUTPUT({11, SGN(R[0])*1});
            010X : OUTPUT({0, SGN(R[0])*11});
            011X : OUTPUT({0, SGN(R[0])*10});
            100X : OUTPUT({13, SGN(R[0])*1});
            101X : OUTPUT({12, SGN(R[0])*1});
            110X : OUTPUT({3, SGN(R[0])*2});
            111X : OUTPUT({1, SGN(R[0])*4});
            }
         }
         01 : R = READ(1); OUTPUT({2,SGN(R)*1}); shv=1;
         10 : R = READ(1); OUTPUT({1,SGN(R)*2}); shv=1;
         11 : R = READ(1); OUTPUT({3,SGN(R)*1}); shv=1;
         }
         SHL(shv);
      }
      3 : {
         Q = READ(3); SHL(3);
         CASE (Q){
         00X : OUTPUT({0, SGN(Q[0])*7});
         01X : OUTPUT({0, SGN(Q[0])*6});
         10X : OUTPUT({4, SGN(Q[0])*1});
         11X : OUTPUT({5, SGN(Q[0])*1});
         }
      }
      4 : {
         Q = READ(3); SHL(3);
         CASE (Q){
         00X : OUTPUT({7, SGN(Q[0])*1});
         01X : OUTPUT({8, SGN(Q[0])*1});
         10X : OUTPUT({6, SGN(Q[0])*1});
         11X : OUTPUT({2, SGN(Q[0])*2});
         }
      }
      5 : Q = READ(19); OUTPUT({Q[18:13], Q[12:0]});
      6 : {
         Q = READ(2); SHL(2);
         CASE (Q){
         00 : R = READ(1); OUTPUT({5, SGN(R)*2}); shv=1;
         01 : R = READ(1); OUTPUT({14, SGN(R)*1}); shv=1;
         10 :{
            R = READ(2); shv = 2;
            CASE (R){
            0X : OUTPUT({2, SGN(R[0])*4});
            1X : OUTPUT({16, SGN(R[0])*1});
            }
         }
         11 : R= READ(1); OUTPUT({15, SGN(R)*1}); shv=1;
         }
         SHL(shv);
      }
      7, 8, 9, 10, 11: JVLC(TableC[T]);
```

-continued

```
    }
}
```

It is noted from the above MatchVLC functions that typically the decoded least significant bit decides the sign of the value, and thus can be checked using the SGN function, which is described as follows:

FUNCTION SGN(R){RETURN (R==1)?−1:1;}

It is further noted that for MatchVLC_3 and MatchVLC_4, the tables are common (or at least a superset), and hence the following table can be used for accessing the functions:

```
FUNCTION JVLC(Table){
    Q = READ(5); //read 5-bits from sREG
    SHL(5);      //shift out 5-bits
    {R,L} = Table[Q];
    RETURN {R,L}; //Zero extend R to 8-bit
                  //Sign extend L to 16-bit
}
```

One interface to the MatchVLC, or rather, MatchVLC_X functions (where X equals 1, 2, etc.) is the following instruction:

VLC_MPEG2 DST, #Imm16, where the #Imm16 value is used to select the appropriate table, and hence to decode a particular syntax element. That is, the tables are accessed from an instruction using #Imm16 as the index for the tables (e.g., 0, 1, 2, 3). The values are given in Table 5 below. Values for #Imm16 and the corresponding method, syntax element, and MPEG-2 table are related by the following table, Table 5:

TABLE 5

| #Imm16 | Method | Syntax Element | MPEG-2 VLC Table |
|---|---|---|---|
| 0 | MatchVLC (B-1, 7) | Macroblock_address_increment | B-1 |
| 1 | MatchVLC (B-9, 8) | Coded_block_pattern | B-9 |
| 2 | MatchVLC (B-10, 6) | Motion_code | B-10 |
| 3 | MatchVLC_1 | Dct_dc_size_luminance | B-12 |
| 4 | MatchVLC_2 | Dct_dc_size_chrominance | B-13 |

TABLE 5-continued

| #Imm16 | Method | Syntax Element | MPEG-2 VLC Table |
|---|---|---|---|
| 5 | MatchVLC_3 | DCT coefficients (Table 0) | B-14 |
| 6 | MatchVLC_4 | DCT coefficients (Table 1) | B-15 |

EXP-Golomb Decoding

Having described the decoding system 200 configured for CABAC decoding (VLD unit 530a via CABAC module 580), CAVLC decoding (VLD unit 530b via CAVLC module 582), and MPEG decoding (VLD unit 530c via MPEG2 module 578), attention is now directed to the EXP-Golomb embodiment of the decoding system 200, referred to herein as VLD unit 530d. The VLD unit 530d is based on operations of the EXP-Golomb module 584 shown in FIG. 5C. The VLD unit 530d uses the same hardware and the same bitstream buffer arrangement as is used for the CABAC and CAVLC embodiments. Hence, features that are shared with the CABAC and CAVLC are omitted herein for brevity except as otherwise noted below. Before describing the VLD unit 530d, a brief discussion of Exp-Golomb is set-forth.

In Exp-Golomb, data consists of a "prefix" and a "suffix" format as shown below:

|  | Range of codeNum |
|---|---|
| 1 | 0 |
| 0 1 $x_0$ | 1-2 |
| 0 0 1 $x_1 x_0$ | 3-6 |
| 0 0 0 1 $x_2 x_1 x_0$ | 7-14 |
| 0 0 0 0 1 $x_3 x_2 x_1 x_0$ | 15-30 |
| 0 0 0 0 0 1 $x_4 x_3 x_2 x_1 x_0$ | 31-62 |
| ... | ... |

Since most code word are short, there is compression to be achieved. Further, most codewords are unique and simple to decode. In H264, there are four EXP-Golomb coding methods used: Unsigned Unary, Signed, Mapped (the code word is mapped to a table). These methods are used for coding the coded macroblock patterns (cmp)), and Truncated (the shorter words are truncated). In the VLD unit 530d, single instructions are provided to implement the decoding of the first three types of EXP-Golomb codes as shown in Table 6 below. The Truncated EXP-Golomb decoding is discussed below.

TABLE 6

| codeNum = EXP_GOLOMB_UD | t = CLZ<br>SHL(t + 1)<br>val = READ(t) //val is unsigned<br>codeNum = $2^t$ − 1 + val |
|---|---|
| codeNum = EXP_GOLOMB_CD(kOrder) | Iz := CountLeadingZero(sREG);<br>sREG := {(sREG << (Iz + 1)), bitStreamBuffer[0:Iz]};<br>J := Iz + kOrder − 1;<br>val := (J >= 0)? ZeroExtend(sREG[0:J]) : 0;<br>sREG := {(sREG << (Iz + 1)),bitStreamBuffer[0:Iz]};<br>codeNum := (1 << (Iz + kOrder)) + (0xFFFFFFFF<br><< kOrder) + val; |
| Seval = EXP_GOLOMB_SD | k = EXP_GOLOMB_UD<br><br>$Seval = (-1)^{(k+1)} Ceil\left(\dfrac{k}{2}\right)$ |

TABLE 6-continued

| cbp = EXP_GOLOMB_MD(Type) | k = EXP_GOLOMB_UD |
| | cbp = TableCBP[Type][k] |

Explaining these instructions further, the EXP_GOLOMB_UD instruction decodes unary coded (ue(v)) coded symbols. The EXP_GOLOMB_SD instruction decodes a signed unary coded (se(v)) coded symbol. As shown in Table 6, for EXP_GOLOMB_SD, when k=0, no distinction is made between positive and negative zero, and hence the value returned is positive zero. The EXP_GOLOMB_MD, SRC1 instruction decodes a mapped coded (me(v)) symbol, where SRC1=Type, which refers to the macroblock parameter, coded_block_pattern. Values of zero or one for the type leads to the following coded_block_parameter:

Type = 0 → Intra 4 x 4
Type = 1 → Inter

A table can be used (e.g., a table in on-chip memory or remote memory) to assign values to coded_block_parameter depending on the macroblock prediction mode (e.g., code number, k).

A further EXP-Golomb instruction to decode a truncated Exp-Golomb (te(v)) symbol can be expressed as follows:

EXP_GOLOMB_TD DST, SRC1, where SRC1 is the range. That is, at least in one embodiment, to implement the truncated EXP-Golomb code requires that the range be known initially, with the range being [1,x]. Then the truncated EXP-Golomb codes can be derived as follows:

```
codeNum = EXP_GOLOMB_TD(range){
    else if(range==1) return READ(1) 1;
    else           return EXP_GOLOMB_UE;
}
```

Thus, four EXP_GOLOMB_D instructions are provided.

It is helpful to explain the differences between opcode and driver-issued software instructions. Generally, there are at least two forces at work when designing an ISA—(1) make the instruction decoder simpler and complete within a single pipeline stage (i.e., make fast), and (2) make the mnemonics simpler for the programmer. Referring to the five EXP-Golomb based operations, these are distinct operations from the user perspective. Further, there are two distinct formats: all of these EXP-Golomb based operations output some value, but only some have an input (other than the bitstream which is implicit in the operation), which provides at least one basis for distinction. That is, typically, CPU instructions do not have an implicit input, but instead, comprise explicit input through the operands. However, the bitstream is not exposed through the operands, but instead, as explained above, is managed automatically internally and initiated using the INIT instructions.

From the hardware perspective, the same hardware (or at least the same core of the hardware) for EXP-GOLOMB-UD can be used with a small addition of hardware about the core to implement all the other EXP-Golomb operations (e.g., somewhat similar to CASE/SWITCH in software). Thus a compiler/translator can map all these operations to a single instruction. Further, these operations are fixed (e.g., the operations do not change dynamically). Referring to the pseudonym column in Table 7 below, it is noted that for UD/SD operations, an SRC1 can be added (and yet be ignored by the core), with a mechanism for distinguishing between them. Also, it is noted that no single source instruction grouping exists, but can be mapped to register-immediate grouping. Thus, now by using explicit immediate numbers for the various instructions as shown in Table 7, a distinction can be made between these instructions, hence resulting in only one major/minor opcode rather than five, which comprises a significant savings. That is, only one minor opcode is used because an immediate format instruction can be used, and distinction between the various EXP_Golomb instructions can be accomplished by coding the immediate data field with appropriate data and assigning a pseudonym for these as shown below:

EXP_GOLOMB_D Dst, #Type, Src1.lane, where the #Type can be determined through the following table 7:

TABLE 7

| #Type | Pseudonym | Instruction |
|---|---|---|
| 0x0 | EXP_GOLOMB_UD Dst | EGOLD Dst, 0x0, Src1 |
| 0x1 | EXP_GOLOMB_SD Dst | EGOLD Dst, 0x1, Src1 |
| 0x2 | EXP_GOLOMB_TD Dst, Src1 | EGOLD Dst, 0x2, Src1 |
| 0x3 | EXP_GOLOMB_MD Dst, Src1 | EGOLD Dst, 0x3, Src1 |
| 0x4 | EXP_GOLOMB_CD Dst, Src1 | EGOLD Dst, 0x4, Src1 |

Explaining Table 7 further, for #type=0x0 or #type=0x1, no Src1 field is required, and there is no need to assign these instructions to another major or minor opcode group since a "dummy" src (note the absence of an explicit zero register in Destination) can be assigned, or Src and Dst can be designated to be the same.

The EXP-Golomb coded symbols are coded as shown in the diagram below (e.g., comprising of zero or more numbers of leading zeros, followed by a 1 and then a number of bits corresponding to the number of leading zeros):

| | Range of codeNum |
|---|---|
| 1 | 0 |
| 0 1 $x_0$ | 1-2 |
| 0 0 1 $x_1 x_0$ | 3-6 |
| 0 0 0 1 $x_2 x_1 x_0$ | 7-14 |
| 0 0 0 0 1 $x_3 x_2 x_1 x_0$ | 15-30 |
| 0 0 0 0 0 1 $x_4 x_3 x_2 x_1 x_0$ | 31-62 |
| ... | ... |

How these bits are interpreted depends on the particular Golomb type (there are three types in H264 and a fourth type in AVS (Advanced Video Standard being promoted by China). For UD and SD (unsigned and signed) arithmetic logic is used to compute the value. For example if the bitstring is 0001010, then for UD, the value is (1<<3)−1+2=9 and for SD, (−1)^10*ceil(9/2)=+5. A similar process occurs for CD (code is given above). However for MD, a table look up is performed (e.g., decode the value as if UD coded and then use this value as an index into a table returning a six-bit value (stored as 6 bit value in the table but the returned value is zero extended to register width)). In one embodiment, there are two tables—one for Intra coded and one for Inter coded.

An example of how the above instruction translations can be used in the context of EXP-Golomb decoding is shown below by the exemplary pseudocode for partial decoding of an H.264 slice header:

```
sliceHeaderDecode:

EXP_GOLOMB_UD   firstMBSlice
EXP_GOLOMB_UD   sliceType
EXP_GOLOMB_UD   picParameterSetID
READ            frameNum, Nval        //NVal determined earlier
IB_GT           frameMbsOnlyFlag, ZERO, $Label1
READ            fieldPicFlag, ONE
IB_EQ           fieldPicFlag, ZERO, $Label1
READ            bottomFieldFlag, ONE
Label1:

ISUBI           t1, #5, nalUnitType
IB_NEQ          ZERO, t1, $Label2
EXP_GOLOMB_UD   idrPicID
Label2:

IB_NEQ          ZERO, picOrderCntType, $Label3
READ            picOrderCntLSB, Nvalt  //Nvalt determined earlier
Label3:

ICMPI_EQ        p1, ONE, fieldPicFlag
[p1]MOV         nfieldPicFlag, ZERO
[!p1]MOV        nfieldPicFlag, ONE
AND             t1, picOrderPresentFlag, nfieldPicFlag
B_NEQ           ONE, t1, $Label4
EXP_GOLOMB_SD   deltaPicOrderCntBottom
Label4:
Translation to sliceHeaderDecode:

EGOLD           firstMBSlice, #0, ZERO
EGOLD           sliceType, #0, ZERO
EGOLD           picParameterSetID, #0, ZERO
READ            frameNum, Nval        //NVal determined earlier
IB_GT           frameMbsOnlyFlag, ZERO, $Label1
READ            fieldPicFlag, ONE
IB_EQ           fieldPicFlag, ZERO, $Label1
READ            bottomFieldFlag, ONE
Label 1:

ISUBI           t1 , #5, nalUnitType
IB_NEQ          ZERO, t1, $Label2
EGOLD           idrPicID, #0, ZERO
Label2:

IB_NEQ          ZERO, picOrderCntType, $Label3
READ            picOrderCntLSB, Nvalt //Nvalt determined earlier
Label3:

ICMPI_EQ p1, ONE, fieldPicFlag
[p1]MOV         nfieldPicFlag, ZERO
[!p1]MOV        nfieldPicFlag, ONE
AND             t1, picOrderPresentFlag, nfieldPicFlag
B_NEQ           ONE, t1, $Label4
EGOLD           deltaPicOrderCntBottom, #1, ZERO
```

VC-1 Decoding

Having described the decoding system 200 configured for CABAC decoding (VLD unit 530a via CABAC module 580), CAVLC decoding (VLD unit 530b via CAVLC module 582), MPEG decoding (VLD unit 530c via MPEG2 module 578), and EXP-Golomb decoding (VLD unit 530d via EXP-Golomb module 584), attention is now directed to the VC-1 embodiment of the decoding system 200, referred to herein as VLD unit 530e. The VLD unit 530e is based on operations of the CLO module 574 and CLZ module 576. VC-1 uses Huffman code, with more tables. Instead of building and testing all these tables, since the bit-rate requirement is low but verification cost is high, the required tables (not all tables are required all the time) are loaded into the NCM memory 564. The table format is same as that used in MPEG-2, and the READ, VLC_CLZ, VLC_CLO and INPSTR instructions are used to decode the bitstream. For example, Table 168 may be implemented using the following pseudo code:

```
//TABLE 168 - I Picture CBPCY VLC TABLE
VLC_CLZ DST0, #8
CASE DST0
0: VALUE = 0; BREAK;   //USE MOVL
1: VLC_CLZ DST1 #5
      CASE DST1
      1 : T = READ(2);
            CASE T
            0 : VALUE = 48; BREAK;
            1 : VALUE = 56; BREAK;
            2 : GO20; BREAK;
            3 : VALUE = 1 ; BREAK;
            CASE_END
      2: VALUE = 2; BREAK;
      3: VLC_CLO DST2, #5
            CASE DST2
            0: VALUE = 28; BREAK;
            1: VALUE = 22; BREAK;
            2: VALUE = 43; BREAK;
            3: VALUE = 30; BREAK;
            4: VALUE = 41; BREAK;
            5: VALUE = 49; BREAK;
            CASE_END
      4: T = READ(1); VALUE = (T)? (READ(1) ? 31 : 54) : 27; BREAK;
      5: VALUE = 6; BREAK;
      CASE_END
2: VLC_CLZ DS1 #4
      CASE DST1
      1: VALUE = 3; BREAK;
      2: T = READ(1); VALUE = (T)? 19 : 36; BREAK;
      3: T = READ(2);
            CASE T
            0: VALUE = 38; BREAK;
            1: VALUE = 47; BREAK;
            2: VALUE = 59; BREAK;
            3: VALUE = 5; BREAK;
            CASE_END
      4: VALUE = 7; BREAK;
      CASE_END
3: T = READ(1); VALUE = (T)? 16 : 8; BREAK;
4: T = READ(1); VALUE = (T) GO10 ? : 12; BREAK;
5: VALUE = 20; BREAK;
6: VALUE = 44; BREAK;
7: T = READ(1); VALUE = (T)? 33 : 58; BREAK; //USE SEL??
8: VALUE = 15; BREAK;
CASE_END
GO10:
INPSTR S1, #3
READ_NCM S2, #0, off+S1>>2
VALUE = S2 & 0x63;
Q = (S2 >> 6) & 0x3;
READ S0, Q
RETURN;
GO20:
INPSTR S1, #4
READ_NCM S2, #0, off+s1>>2
VALUE = S2 & 0x63;
Q = (S2 >> 6) & 0x3;
READ S0, Q
RETURN;
```

In some embodiments, the CASE statements reflected above may be substituted with branch instructions. Thus the VC-1, like MPEG-2, has a well defined grammar. A symbol in the grammar has a specific method (table) which can be implemented as a shader as shown in the code above.

It should be emphasized that the above-described embodiments, particularly, any "preferred" embodiments, are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A decoding system in a graphics processing unit, comprising:
a software programmable core processing unit having a variable length decoding unit (VLD) unit, the VLD unit capable of performing shader functionality, the shader functionality including selectively implementing decoding of a video stream coded based on at least one of a plurality of different coding methods to provide a decoded data output, wherein the VLD unit further comprises a direct memory access (DMA) engine module comprising a bitstream buffer and DMA engine, the DMA engine module configured to, responsive to execution of a shader instruction per slice, repeatedly and automatically buffer in the bitstream buffer a predefined quantity of bits as the predefined bits are consumed, the bits corresponding to the video stream, and wherein the VLD unit is further configured to stall the DMA engine module responsive to anticipated underflow in the bitstream buffer,
wherein the decoding is implemented using a combination of software and hardware.

2. The system of claim 1, wherein the decoding is accomplished within the context of graphics processing unit programming, with the hardware implementation in a graphics processing unit data path and additional hardware for automatic management of a bitstream buffer, and wherein the plurality of coding methods comprise two or more of context-adaptive binary arithmetic coding (CABAC), context-adaptive variable length coding (CAVLC), EXP-Golomb, Motion Pictures Expert Group (MPEG-2), and VC-1.

3. The system of claim 1, wherein responsive to the VLD unit configured for CABAC decoding, the VLD unit further comprises:
a binarization (BIND) module configured to receive first information comprising a syntax element and a context block category, and, responsive to execution of a first shader instruction by the BIND module, provide second information corresponding to one or more macroblock parameters based on the first information for use in context modeling;
a get context (GCTX) module configured to receive the second information, and, responsive to execution of a second shader instruction by the GCTX module, provide a bin and context identifier for use in bin decoding, wherein the context identifier corresponds to a most probable symbol (MPS) value or a least probable symbol (LPS) probability; and
a binary arithmetic decoding (BARD) module configured to receive the bin and context identifier and an offset and a range, and, responsive to execution of a third shader instruction by the BARD module, decode a binary symbol.

4. The system of claim 3, further comprising a context memory array for context based decoding and corresponding registers, wherein the content memory array comprises elements for a current and a neighboring macroblock, wherein responsive to execution of a fifth shader instruction by the get context (GCTX) module, the GCTX module is configured to write to the context memory array based on Boolean logic operations involving the transfer of values from the registers to the context memory array.

5. The system of claim 1, wherein the VLD unit further comprises a binstring register configured to receive a decoded binary symbol and provide updated context information.

6. The system of claim 5, wherein the binstring register is configured to receive a plurality of binary symbols representing a decoded syntax element.

7. The system of claim 1, wherein responsive to the VLD unit configured for CAVLC decoding, the VLD unit further comprises:
a coefficients token (coeff_token) module configured to receive macroblock information, and, responsive to a sixth shader instruction (CAVLC_TOTC), provide trailing ones information and total coefficient information;
a level (CAVLC_Level) module configured to receive the trailing ones information and level code information, and, responsive to a seventh shader instruction (CAVLC_LVL), provide suffix length information and level index (Level[Idx]) information, wherein the level index (Level[Idx]) information is incremented;
a level code (CAVLC_LevelCode) module configured to receive the suffix length information and, responsive to an eighth shader instruction (CAVLC_LC), provide the level code information to the CAVLC_Level module;
a level0 (CAVLC_L0) module configured to receive the trailing ones information and, responsive to a ninth shader instruction (CAVLC_LVL0), provide second level index information (Level[Idx]) to a level array, wherein the second level index (Level[Idx]) information is incremented;
a zero level (CAVLC_ZL) module configured to receive the total coefficients information and a maximum number of coefficients information and, responsive to a tenth shader instruction (CAVLC_ZL), provide a zeros left information and a reset value to first and second multiplexers; and
a run (CAVLC_Run) module configured to receive the zeros left information and second index information from the first and second multiplexers, respectively, and, responsive to an eleventh shader instruction (CAVLC_RUN), provide a run index (Run[Idx]) to a run array.

8. The system of claim 7, wherein the level array and the run array are configured to provide a decoded level value and decoded run value, responsive to a twelfth shader instruction (READ_LRUN).

9. The system of claim 7, wherein the level array and the run array are configured to be cleared responsive to a thirteenth shader instruction (CLR_LRUN).

10. The system of claim 1, wherein the VLD unit is further configured to use bits in an instruction to determine whether a result of a previous operation stored in an internal register should be used or a data in a source operand should be used for a current operation at one or more modules.

11. The system of claim 1, wherein the DMA engine is further configured to track the number of bits consumed in the bitstream buffer, and responsive to detecting that the number is larger than a predefined quantity, halt the bitstream buffer operation and transfer control to a host processor.

12. The system of claim 1, wherein responsive to the VLD unit configured for MPEG-2 decoding, the VLD unit further comprises:
    an MPEG2 module configured to implement MPEG-standard tables using one or more Match VLC functions, each of the one or more MatchVLC function corresponding to a respective syntax element, the table selection based on a shader instruction.

13. The system of claim 12, wherein the MatchVLC functions are implemented at least partially in hardware.

14. The system of claim 1, wherein responsive to the VLD unit configured for EXP-Golomb decoding, the VLD unit further comprises:
    an EXP-Golomb module configured to implement a plurality of EXP-Golomb operations using a single opcode, each of the plurality of EXP-Golomb operations distinguishable using distinct values in an immediate data field value in a shader instruction.

15. The system of claim 1, wherein responsive to the VLD unit configured for VC-1 decoding, the VLD unit is configured to selectively load VC-1 tables to a context memory array, wherein decoding is based on the selectively loaded tables.

* * * * *